United States Patent
Mayr et al.

(10) Patent No.: US 8,600,854 B2
(45) Date of Patent: *Dec. 3, 2013

(54) METHOD AND SYSTEM FOR EVALUATING CUSTOMERS OF A FINANCIAL INSTITUTION USING CUSTOMER RELATIONSHIP VALUE TAGS

(75) Inventors: Mona Mayr, Naperville, IL (US); Darcy Walker, Buffalo Grove, IL (US); Yinghua Lin, Los Alamos, NM (US); Guowei Wu, Charlotte, NC (US); Stephen V. Coggeshall, Los Alamos, NM (US)

(73) Assignee: Fair Isaac Corporation, San Jose, CA (US)

( * ) Notice: Subject to any disclaimer, the term of this patent is extended or adjusted under 35 U.S.C. 154(b) by 1016 days.

This patent is subject to a terminal disclaimer.

(21) Appl. No.: 12/111,802

(22) Filed: Apr. 29, 2008

(65) Prior Publication Data
US 2008/0208677 A1 Aug. 28, 2008

Related U.S. Application Data

(63) Continuation of application No. 09/135,654, filed on Aug. 18, 1998, now Pat. No. 7,376,603.

(60) Provisional application No. 60/056,540, filed on Aug. 19, 1997.

(51) Int. Cl.
*G06Q 40/00* (2012.01)

(52) U.S. Cl.
USPC ............................................. 705/35; 705/1.1

(58) Field of Classification Search
USPC ................................................ 705/35, 1.1, 4
See application file for complete search history.

(56) References Cited

U.S. PATENT DOCUMENTS 5,721,831 A * 2/1998 Waits et al. ................. 705/36 R
5,761,647 A * 6/1998 Boushy ......................... 705/7.29
5,822,410 A * 10/1998 McCausland et al. ... 379/114.01

OTHER PUBLICATIONS

§ The Fallacy of Customer Retention Series: 13; Carroll, Peter. American Banker (pre-1997 Fulltext) [New York, N.Y] Jul. 23, 1991.*
§ Woodruff, R. B. (1997). Customer value: The next source for competitive advantage. Academy of Marketing Science Journal, 25(2), 139-153.*
Libey, D. R. (1995). Keep one more customer. Target Marketing, 18(9), 30-30. Retrieved from http://search.proquest.com/docview/233103064?accountid=14753.*

* cited by examiner

*Primary Examiner* — Alexander Kalinowski
*Assistant Examiner* — Abhishek Vyas
(74) *Attorney, Agent, or Firm* — Mintz, Levin, Cohn, Ferris, Glovsky and Popeo, P.C.

(57) ABSTRACT

A computerized method and system for evaluating customers of a financial institution using customer relationship value tags associated customer treatment actions includes automatically analyzing information about a customer from a database of the financial institution by a customer assessment engine using a predefined statistical model to assess the value of the customer to the financial institution. At least one customer treatment action associated with the assessed value is identified by the assessment engine, and the assessment engine marks a file associated with the customer with a mark representing the assessed value and the associated customer treatment action. The marked file is then accessed by other financial systems of the financial institution, or by customer representatives of the financial institution, and the associated customer treatment action is implemented by such systems or representatives in dealing with the customer.

13 Claims, 20 Drawing Sheets

CRVD DATABASE TABLES — 34

ASSESSED_CUSTOMER — 36
CUSTOMER_TREATMENT — 38
CUSTOMER_SCORE — 40
CUS_FV_CONT_HIS — 42
CUS_FV_CATG_HIS — 44
ACCT_CVR_VAL_HIS — 46
ACCT_PERF_HISTORY — 48
DECISIONED_CUSTOMER — 50
DECISIONED_APPL — 52
APPL_RPT_GROUP — 54
ACCT_RVT_HISTORY — 64
CUS_RVT_HISTORY — 66

FIG. 3

SOURCES OF VARIABLES

| CALCULATION | CUSTOMER-FV HISTORY TABLE | ACCOUNT-PV HISTORY TABLE | SECTOR CIDBase DATA ELEMENTS | STRATA ATTRIBUTE TABLES | ASSESSMENT DRIVER CALCULATED ATTRIBUTES | ACCOUNT EXTRACT ATTRIBUTE |
|---|---|---|---|---|---|---|
| g | | | X | X | X | |
| M(mob) | | | X | | X | |
| f(N) | | | X | X | X | |
| x | | | X | X | X | |
| $P_{default}$ | | | X | X | X | |
| $P_b(mscore)$ | | | X | | X | |
| CNR | | | X | X | X | |
| Current Value | | | X | | X | |
| TXN | | | X | | X | |
| Present Value for Every Account | | X | | X | X | |
| Present Value of TXN | X | | | X | X | |

FIG. 6

| Stata Account Extract Attribute | Description | Equation |
|---|---|---|
| 70 ASSTNUM | average asset number | $\sum_{m=1}^{6} [wtm. NUM - ASSET]$ |
| 72 AVGABAL | average asset balance | $\sum_{m=1}^{6} [wtm. \sum_{a} BAL_a]$ |
| 74 MAXABAL | maximum asset balance | $MAX[BAL_a]$ |
| 76 AVGACBAL | maximum asset correlation balance | $AVG\text{-}ASSET\text{-}BAL\text{:}avg\text{-}bal_a$ |
| 78 AVGACINT | average asset correlation interest | $\sum_{m=1}^{6} [wtm. \sum_{a} \frac{Bal_a.INT_a}{AVG-BAL.avg\text{-}int_a}]$ |
| 80 LIABNUM | average liability number | $\sum_{m=1}^{6} [wtm. NUM - ASSET]$ |
| 82 AVG-LIAB-BAL | average liability balance | $\sum_{m=1}^{6} [wtm. \Sigma BAL_l]$ |
| 84 MAXLBAL | maximum liability balance | $Max[Bal_l]$ |
| 86 AVGLCBAL | average liability correlation balance | $\frac{AVG - LIAB - BAL}{avg - bal_l}$ |
| 88 AVGLFEES | average liability fee | $\sum_{m=1}^{6} [wtl. FEE_l]$ |
| 90 FOOTING | total footing | $AVG\text{-}ASSET\text{-}BAL - AVG\text{-}LIAB\text{-}BAL$ |
| 92 MAXHHTCL | maximum household credit limit | $MAX[hh\_tot\_cr\_lim_m]$ |
| 94 MAXHHBCL | maximum household bankcard credit limit | $MAX[hh\_bcd\_cr\_lim_m]$ |
| 96 AVGHHMED | average household median income | $\sum_{m=1}^{6} wtm. Max[hh\text{-}med\text{-}inc]$ |
| 98 AVGHHCNT | average household total service count | $\sum_{m=1}^{6} wtm. \Sigma hh\text{-}tot\text{-}serv\text{-}cnt$ |

*FIG. 7*

| Stata Account Extract Attribute | Description | Equation |
|---|---|---|
| AVGHHBAL | average household total service balance | $\sum_{m=1}^{6} wtm. \sum hh\text{-}tot\text{-}serc\text{-}bal$ |
| AVGMNPMT | average payment bill | $\sum_{m=1}^{6} wtm.\ PYMT\text{-}BILL$ |
| AVGCNR | average CNR | $\sum_{m=1}^{6} wtm.\ CNR$ |
| AVGDLQ | average delinquency days | $\sum_{m=1}^{6} wtm.\ DLNQ\text{-}DAYS$ |
| AVGDUR | average duration | $\sum_{m=1}^{6} wtm.\ duration_m$ |
| AVGTCRLM | average total credit limit | $\sum_{m=1}^{6} wtm.\ tot\text{-}cr\text{-}lim_m$ |
| OLDSTMOB | months on book | observation month-oldest account open date |
| MAXBKT | total maximum bucket | $MAX[PAST\text{-}DUE\_IND]$ |
| AVGMXBKT | average maximum bucket | $\sum_{m=1}^{6} wtm.\ Max[PAST\text{-}DUE\text{-}IND]$ |
| HHOLDMBR | household oldest member date | observation month - HH-OLD-MEM-DATE |
| SIGMA3 | standard deviation of present value | $\sqrt{\sum_{m=1}^{6}\left[wtm.\ (Vm - \frac{pv}{4.5})^2\right]}$ |

FIG. 7 (CONT'D)

CONTINUOUS VARIABLE SOURCES

| CALCULATION | CUSTOMER-FV HISTORY TABLE | ACCOUNT-PV HISTORY TABLE | SECTOR CIDBase DATA ELEMENTS | STRATA ATTRIBUTE TABLES | ASSMT. DRVR. CALCULATED ATTRIBUTES | ACCOUNT EXTRACT ATTRIBUTE |
|---|---|---|---|---|---|---|
| 70 ASSTNUM | X | | | | | |
| 72 AVGABAL | X | | X | X | X | X |
| 74 MAXABAL | | | X | X | | X |
| 76 AVGACBAL | X | | X | | X | X |
| 78 AVGACINT | X | | X | X | X | X |
| 80 AVGLNUM | X | | X | | X | X |
| 82 AVGLBAL | X | | X | X | X | X |
| 84 MAXLBAL | | | X | X | | X |
| 86 AVGLCBAL | X | | X | | X | X |
| 87 AVGLCINT | X | | X | X | X | X |
| 88 AVGLFEES | X | | X | | X | X |
| 90 FOOTING | | | X | X | X | X |
| 92 MAXHHTCL | X | | X | | X | X |
| 94 MAXHHBCL | X | | | | X | X |
| 96 AVGHHMED | X | | X | | X | X |
| 97 AVGHHOPN | X | | X | X | X | X |
| 100 AVGHHBAL | X | | X | X | X | X |
| 102 AVGMNPMT | X | | X | X | X | X |
| 104 AVGCNR | X | | | X | X | X |
| 106 AVGDLQ | X | | X | X | X | X |
| 108 AVGDUR | X | | X | X | X | X |
| 110 AVGTCRLM | X | | X | | X | X |
| 112 OLDSTMOB | | | X | | X | X |
| 114 MAXBUCKT | | | X | X | X | X |
| 116 AVGMXBKT | X | | | | X | X |
| 118 HHOLDMBR | | | X | | | X |

FIG. 8

CRAE TABLES

| TABLE NAME | DESCRIPTION |
|---|---|
| Inbound Event | Transactions that the Assessment Driver sends to CRAE. CRAE takes the information and performs the necessary processes. |
| System Attribute | Attributes that CRAE needs in order to process the accounts. Attributes can come from: Sector CIDBase, Assessment Driver, Calculation, Strata User Exit, Strata Internal Reserved Attribute, Strata Attribute Tree, and Strata Calculation Formula. |
| Target System | Systems or tables to which Strata sends instructions. |
| Instruction Code | Names of instructions sent to the target systems. |
| Instruction Layout | Position, length, attribute names, and/or values of the instructions. |
| Outbound Event | |
| Portfolio Edit | Listing of available portfolios. |
| Portfolio Assignment Tree | Tree that assigns accounts to portfolio(s). |
| Test Group | Names of test groups. |
| Report Group | |
| Score Model | Defines the score models. |
| Matrix | |
| Instruction List Definition | Instructions that are associated with each of the instruction names. One of more instructions codes may be sent once an instruction is triggered. |
| Decision Definition | Defines the decisions. |
| Decision Assignment Tree | Processes the accounts using decision tree. |
| Process Definition | Defines what type of action is associated with each process. |
| Inbound Event Processing | Shows which processes are initiated by an Inbound Event. |
| Portfolio Definition | Associates the processes with the report groups and specifies the percentage of accounts to be assigned to each report group. |
| Report Parameter | |

*FIG. 11*

METHOD AND SYSTEM FOR EVALUATING CUSTOMERS OF A FINANCIAL INSTITUTION USING CUSTOMER RELATIONSHIP VALUE TAGS

RELATED APPLICATION

This application is a continuation of U.S. patent application Ser. No. 09/135,654, filed on Aug. 18, 1998 (now U.S. Pat. No. 7,376,603), which in turn claims priority to U.S. Pat. App. Ser. No. 60/056,540 filed on Aug. 19, 1997.

FIELD OF THE INVENTION

The present invention relates generally to the field of computerized evaluation of customers of a financial institution such as a bank and, more particularly, to assessing the value of a customer by analyzing information about the customer from a database of the financial institution and identifying an appropriate customer treatment action from the assessed value of the customer to the financial institution.

BACKGROUND OF THE INVENTION

In order to achieve and maintain a strong brand identity and reputation, it is incumbent on a financial institution to attract high quality customers and to establish broad, long standing relationships with those customers. Such relationships, when appropriately managed, will deliver high value to the financial institution in terms of increased revenues and higher profit margins. To attain this objective, customer profitability must be measured, tracked, and utilized as a basis for customer focused initiatives.

However, customer level profitability can be complex to calculate, especially if the financial institution desires to account for every transactional cost associated with the relationship. While financial institutions are generally desirous to measure customer profitability within their retail sectors, few have achieved true customer level cost accounting.

Consequently, financial institutions do not take customer value into consideration in making credit decisions. Instead, such decisions are based on calculated risk levels and financial institution policy. As a result, high value and low value customers who are at the same risk level receive the same treatment. In some cases, the financial institution may be likely to turn away profitable business and potentially alienate some of its best customers.

There is a need for a method and system of measuring and utilizing customer value applying modern statistical modeling techniques to assess the current and future values of a specific customer relationship to a financial institution such as a bank and to use the assessed values to adjust credit decisions on a customer by customer basis in order to continually maximize profitability.

For example, the financial institution can assign higher credit limits to a customer whose value is assessed as high to improve customer attitude and utilization, stimulate further relationship expansion, and promote longer term loyalty.

Further, value assessment can be used in decision making across a variety of financial institution functions, such as marketing, servicing, and collection.

Moreover, the resulting customer treatment actions can be coordinated across financial institution functions so that the customer is treated consistently across all functions in accordance with the assessed value of the customer.

SUMMARY OF THE INVENTION

It is an object of the present invention to provide an automated computerized system for extracting information about customers from a database of the financial institution and assessing the value of particular customers to the financial institution using modern statistical modeling techniques.

It is another object of the present invention to provide a computerized system for using the assessed values to identify appropriate customer treatment actions for dealing with customers of the financial institution on a customer by customer basis according to the assessed values.

It is a further object of the present invention to provide an automated system for utilizing the assessed values to coordinate customer treatment actions by the financial institution on a consistent basis according to the assessed values across all functions of the financial institution.

In an embodiment of the present invention, the customer database of the financial institution is analyzed to develop current and future value algorithms. The current value tags are derived by calculating the revenues generated from a customer and subtracting the appropriate costs (in actuality, a reasonable estimate of costs). The future value tags are the projected value of a customer for a predetermined period into the future. Costs are identified and allocated to each customer. As an integral element of the customer management infrastructure of the financial institution, the value tags enable the financial institution differentiate its services through enhanced understanding of the behavior of each customer.

In an embodiment of the present invention, customer value initially shapes acquisition decisions. High value and low value customers, for example, receive differentiated treatment that allows the financial institution to maximize revenue and profits. In addition, implementation of value tags in acquisition serves as a cornerstone to establish customer focused management strategies across all functions. Both the value tags and the related decisioning infrastructure are used to execute customer management strategies in marketing, servicing, and collection. Customer tags measure not only value, but other factors such as the probability of delinquency, delivery channel preference, attrition, or propensity to buy financial institution products. The coordinated execution of customer management strategies across all functions leads to significantly higher revenues and profits. At the same time, customer satisfaction is improved since customers are offered the right product, the right line assignment, the right pricing, and the right service at the right time.

In an embodiment of the present invention, the technical architecture of the value tags serves as the foundation for the financial institution to provide superior value to customers by using a common set of customer-based measures across all customer touchpoints. To support this objective, computer systems of the financial institution are configured to implement the customer value tags. Financial institution databases provide the customer data necessary to create the tags. For example, a computer program or engine which, for example, currently calculates credit risk, is used to create the tags, segment the customer population using the tags, and assign the appropriate customer treatment actions. Such an engine also provides the financial institution with a flexible capability to conduct control group testing and algorithm validation. The on-line environment of the financial institution retrieves and uses the treatment actions for the execution of value-based acquisition decisions. The financial institution uses the tags to formulate treatment actions for different customer segments. These treatment actions are proactive (financial institution-initiated) or reactive (customer-initiated). For example, a high value customer may be pre-approved for a particular credit amount (proactive). On the other hand, a low value customer may be denied a fee waiver (reactive).

In an embodiment of the present invention, the value tags are implemented in a decision engine of the financial institution which provides maximum flexibility in the way the tags are deployed and used. This approach also allows control group testing and the timely generation of effectiveness reports. The effectiveness of two or more customer management strategies is compared through control group testing. Customers are randomly assigned to test groups, and differing customer management strategies are applied to the test groups. One test group serves as the baseline case, where the tags are not used in the decisioning process. Other test groups-use the tags in different ways to arrive at various treatment decisions. The results are then compared and used to create more effective strategies. Various types of reports are generated in connection with value tags, such as decision effectiveness reports and algorithm validation reports. For example, the decision effectiveness reports compare the results of various treatment actions by test groups. Such reports show whether using the value tags to make certain decisions results in higher revenues. Further, the algorithm validation reports summarize historical performance data to determine how effective the algorithms are in predicting future value.

To achieve the stated and other features, advantages and objects of the present invention, an embodiment of the invention provides a computerized method and system for evaluating customers of a financial institution, such as a bank, using customer relationship value tags and associated customer treatment actions. The method and system for an embodiment of the present invention analyzes information about at least one customer from a database of the financial institution to assess the value of the customer of the financial institution. At least one customer treatment action associated with the assessed value is identified, and a file is marked with a value tag in the database associated with the customer with a mark representing the assessed value and the associated customer treatment action. The marked file is then accessed by other financial institution systems or by financial institution representatives, and the associated customer treatment action is implemented in dealing with the customer.

In an embodiment of the present invention, the customer information is automatically extracted from the database, for example, by an extraction routine. The extracted information includes customer extract records and customer account records. A file is automatically formatted from the extracted information, for example, by an assessment driver and transmitted automatically to the assessment engine. The assessment engine automatically analyzes the customer information using predefined parameters, including statistical models, to assess the value of the customer. The statistical models include predefined parameters, for example, for a present value model to assess the present value of the customer and a future value model to assess the future value of the customer. The information used in assessing the customer includes current customer information and historical customer information. The customer information includes, for example, customer-account information, customer demographic information, customer financial information, and customer transaction information.

In an embodiment of the present invention, the information is analyzed in response to a request for assessment of the customer. The request is transmitted, for example, automatically by a customer acquisition system of the financial institution in response to entering a request for a financial institution product, such as a loan, for the customer on the acquisition system. The request is entered, for example, by a customer representative of the financial institution on a financial institution terminal connected to the acquisition system. Analyzing the information is also automatically performed periodically according to predefined parameters such as date counters or by event triggers such as bankruptcy of the customer.

In an embodiment of the present invention, the assessed value of the customer to the financial institution includes one or both of the present value of the customer and the future value of the customer. The customer is assessed as either having a high value or a low value to the financial institution. Alternatively, the customer may be assessed as having a medium high value or a medium low value to the financial institution. The customer treatment actions which are identified as associated with the respective assessed values include, for example, a price reduction or increase for a financial institution product to the customer, a financial institution credit line assignment amount increase or decrease for the customer, overriding either a high risk score or a low risk score for the customer by the financial institution, reducing a potential loss exposure for the financial institution with respect to the customer, or an offer by the financial institution to the customer of a new product. Any one of such customer treatment actions, or a combination of such customer treatment actions is identified as associated with the assessed value of the customer to the financial institution. The information about the customer that is analyzed is stored in a customer information database of the financial institution. After the customer is assessed, the customer information database is updated with information about the assessed value and associated customer treatment action for the customer.

In an embodiment of the present invention, the file marked or tagged with the assessed value of the customer and associated customer treatment action is accessed in an on-line environment, for example, by a tags update driver connected to one or more databases, including for example, the customer information database and a customer relationship value tags database. The tags driver transmits the information about the assessed value and associated customer treatment action to either or both of these databases. The customer relationship value database is automatically accessed by a customer acquisition system connected to the database to retrieve the information about the assessed value of the customer and associated customer treatment action, for example, in response to entering a request for a financial institution product, such as a loan product, for the customer on the customer acquisition system by a financial institution customer representative at a terminal connected to the acquisition system.

In an embodiment of the present invention, information is also analyzed about a plurality of financial institution customers, and files associated with the respective customers are marked with assessed values and associated customer treatment actions. The plurality of customers are segmented and assigned into reporting groups, including a control group and a test group. A determination is made of the effectiveness of implementing respective customer treatment actions for the control group customers as well as for the test group customers. The effectivenesses of implementation of the customer treatment actions for the respective groups are compared, and a report of the comparison is automatically generated.

Additional objects, advantages and novel features of the invention will be set forth in part in the description which follows, and in part will become more apparent to those skilled in the art upon examination of the following or may be learned by practice of the invention.

BRIEF DESCRIPTION OF THE DRAWINGS

FIG. 3 is a list of sample customer relationship value database tables for storing value tag information for an embodiment of the present invention;

FIG. 6 is table showing the sources for variables used in calculating the present value of a customer for an embodiment of the present invention;

FIG. 7 is a table showing the equations used to derive the continuous variables for an embodiment of the present invention;

FIG. 8 is a table showing the sources for variables used in calculating the future value of a customer for an embodiment of the present invention;

FIG. 11 is a schedule showing sample tables implemented in the customer relationship assessment engine for an embodiment of the present invention;

DETAILED DESCRIPTION

Figure 1:
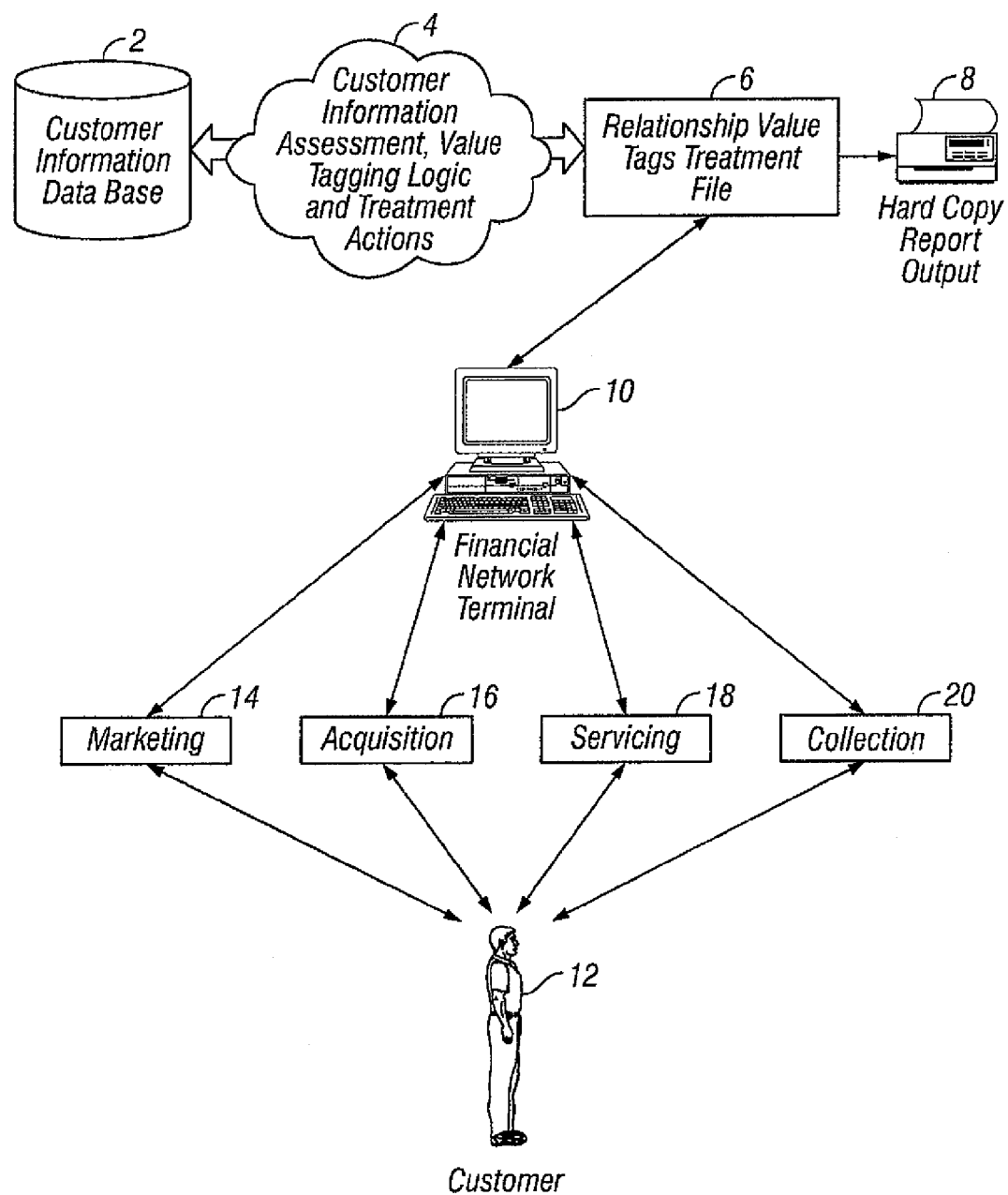
FIG. 1 shows a simple overview of the key components for an application of the method and system of evaluating customers using customer relationship value tags for an application of an embodiment of the present invention.

In an embodiment of the present invention, value tags provide insight into the value, preference, and behavior of a customer. While value tags measure the current value and expected value over time of a customer, other tags measure such things as propensity to open a loan account and likelihood of attrition. Value tags enable the financial institution to make the right decisions for the right customer at the right time. The database of a financial institution typically contains information on a large number of financial institution accounts. On a periodic basis, the servicing systems update the database with customer demographics, financial data, and transaction summary information. Internal customer information from the database of the financial institution is analyzed to develop current and future customer value algorithms. The current value algorithm measures the value of a customer across product holdings of the financial institution. The future value algorithm measures the expected value of the financial institution product holdings of a customer for a predetermined period in the future. Both algorithms are relatively simple calculations or linear combinations.

Several issues arise in the development of the value tags according to an embodiment of the present invention. The value algorithms are based on existing customers who have relationship history with the financial institution. For new customers, some required attributes for calculating the tags will not always be available. Thus, the algorithms will not accurately measure the value of new customers without external data. There are two distinct ways to measure current customer value, namely, the traditional "snapshot" approach and the "moving average" approach. The snapshot approach assembles all the accounts that a customer currently holds with the financial institution and then calculates the current value. This approach measures value at a point in time such as the current time. Since a customer's product holdings can change drastically from month to month, the traditional snapshot approach tends to have more fluctuation over time when compared to the moving average approach.

In the calculation of customer net revenue (CNR) and net credit loss (NCL), the allocation of costs to each customer is traditionally averaged over the total number of customers. However, this approach is misleading. For example, Customer A may write 100 checks and call the bank ten times per month while Customer B may write 20 checks and call the bank two times per month. The traditional costing method would indicate that the costs to serve both customers are the same. Each customer is allocated the cost of writing 60 checks (average of 100 and 20) and six calls (average of ten and two) to the bank. In reality, Customer A is more expensive to serve than Customer B. Similar examples apply in collecting on delinquent accounts. It may cost more to collect from Customer A than from Customer B, but the traditional costing method averages and allocates collection costs equally to both customers.

In an embodiment of the present invention, customer tags are used to segment the customer base, determine customer management strategies, and assign treatment actions. In acquisition, value tags determine the criteria for decisions such as turndowns and approvals, pricing, and credit line assignment. In addition to value tags, other types of tags for risk, propensity to buy, and attrition are used to segment the customers and to assign customer management strategies. Such strategies are coordinated and executed across all financial institution functions. Current and future values are used to segment the customer base and to assign the appropriate strategies and treatment actions.

In an embodiment of the present invention, there are different methods of assigning treatment actions as well as different types of actions that are assigned to the customer segments. By using decision trees and matrices, the decision engine allows the deployment of numerous decisioning methods. For example, in final decisioning, the override tolerance of different score cutoffs are assigned for different customer segments. Alternatively, an "override" indicator is assigned for the very high value customers, so that the turndowns resulting from pre-existing financial institution decisioning processes are overridden. Further, in pricing financial institution products, specific pricing ranges are specified for the customer segments. Further, the decision engine can assign various spreads above a base rate. If the base is the prime rate, high value customers are given, for example, a lower interest rate spread above prime, while a low customer is assigned a higher interest rate spread above prime. Additionally, credit line amounts depend on customer value. As an alternative, the recommended line is a percentage of the maximum debt burden offer, income, or any other customer attribute, where the percentage varies depending on the customer value segment. Likewise, in the disaster review process, override indicators are set so that all or some rules are overridden. High current value customers with high future value are assigned overrides for all disaster rules, while high current value customers with low future value are assigned overrides for only selected disaster rules. Also, for credit qualification and cross-selling purposes, high value customers are offered multiple products and higher line amounts, while others are offered one product with lower credit limits, depending on propensity to buy.

Currently, customer value is not factored into acquisition decision by financial institutions. Therefore, the use of customer value tags, according to an embodiment of the present invention, is an opportunity to improve acquisition decisions and increase revenue and profit. Use of value decisioning in pricing, credit line assignment, disaster review, and credit applications represents only a single point in the ultimate range of how the value tags are used in acquisition. In reality, there are numerous value-specified "cells" within which policies are set. More comprehensive applications of the tags span multiple products and decisions. The current score decisioning process of financial institutions typically uses score ranges from a minimum up to a maximum with intermediate score ranges in between and associated decisions. The value-based score decisioning, according to an embodiment of the present invention, provides an override score cutoff range for high current and future value customers. In value-based decisioning, the override score cutoff range depends on customer value. The goal is to approve a higher percentage of the high value customers and fewer of the low value customers without increasing the overall risk of default exposure for the financial institution.

The present pricing matrix of financial institutions typically uses the relationship amount, which ranges from $0 up to a maximum dollar amount, to determine price expressed in percentage over a base rate. In an embodiment of the present invention, instead of relationship amount, value-based pricing uses current and future values to vary the price. For example, a higher current and future value customer qualifies for the lowest percentage interest rate over the base rate. The present line matrix uses the relationship amount and income to determine line amount with lower line amounts for lower monthly incomes, i.e., relationship amounts. In an embodiment of the present invention, the value-based line assignment first obtains the line amount from the existing matrix and adjusts the amount according to customer value as a percentage above the matrix line amount.

In an embodiment of the present invention, there are other ways of obtaining value-based line amounts. For example, current and future values are used in the rows and columns of the line assignment matrix so that the line amount varies by customer value. Currently, certain credit applications are reviewed according to predetermined disaster rules. In an embodiment of the present invention, this requirement is modified so that high value customers are reviewed under less stringent disaster criteria. Conversely, low value customers are reviewed under more stringent disaster criteria. Customer value is also used to determine whether products should be offered to a customer. For example, customers with high future value are targeted with product offers. However, to determine which product to offer, propensity to buy algorithms are used in conjunction with the value tags. Propensity to buy measures available on the database of the financial institution are be readily used in the acquisition decisioning process.

In an embodiment of the present invention, with multiple tags, numerous customer segments are identified. Each of the segments is associated with customer management strategies such as "Retain & Please" or "Sell & Enhance." The strategies translate into coordinated treatment actions across marketing, acquisition, servicing, and collection functions of the financial institution. There are numerous ways of defining the customer segments and associated strategies using the tags. For example, customers are segmented into high, medium, and low. Both the number of segments and the number of tags vary. Based on experimental results, some customer segments are combined or new segments are identified. Likewise, new tags, such as propensity to use electronic delivery channels, are used to measure other types of customer behavior. Treatment actions are tailored toward the customer segments and coordinated across functions. Treatment actions are both proactive and reactive. The treatment actions are geared toward recognizing the value, preferences, and anticipated behavior of a customer, and to adjusting the actions and processes of the financial institution accordingly in order to maximize the value of each relationship.

In an embodiment of the present invention, the performance of existing customer management strategies are continually improved when those strategies are evaluated against new strategies. This is accomplished through control group testing. First, customers are randomly assigned to test groups. Second, different customer management strategies are applied to the test groups. Third, the results are obtained and compared. Based on the results, new treatment actions are developed. Control group testing is important in determining which treatment actions are effective or whether the value tags result in enhanced financial performance for the financial institution. The system, according to an embodiment of the present invention, randomly assigns customers to test groups so that different decisions are applied and tested on statistically similar groups of customers. Customers are randomly assigned to each of the test groups. If there are three test groups, for example, a percentage of the customers are assigned to Test Group 1, another percentage to Test Group 2, and the balance to Test Group 3.

In an embodiment of the present invention, within each test group, customers are segmented into report groups. A report group has the same name across the test groups, and comparisons are made across the test groups. Any of the value tags or relationship information is used to specify report groups. For example, tenure (length of relationship with the financial institution) is used to assign report groups for the High Value customer segment. Further, two or more attributes are overlaid to define the report groups. Different decisions are assigned to each of the cells defined by report groups and test groups. Different pricing is assigned, depending on tenure and test group. The goal is to verify which pricing decision performs the best in terms of bringing in the highest revenues and/or having the lowest charge-offs. Higher pricing to a customer may generate the highest short term revenues, but in the long run, the customer may defect if better pricing is offered by a competitor. Similar tests are conducted for credit line assignment, where the different approved amounts for the various customer segments are tested. For final credit decisioning, the different risk score cutoffs are assigned and tested on different customer value segments.

In an embodiment of the present invention, each customer is assigned a test group ID and a report group ID, which are recorded in the reporting database and other databases. Customer behavior is tracked in order to record the effectiveness of treatment actions. Average balance, delinquency level, and interest earned, for example, is matched back to the customer segments for performance reporting. Given the performance information for each decision, the best performing decisions are chosen for each of the report groups. A matrix is used to point out the best performing decisions for each of the report groups. For high value customers with greater tenure, higher pricing, for example, may bring in the highest average profit per customer. For customers with intermediate tenure and for customers with lower tenure, lower pricing and still higher pricing, respectively, may perform best. The best performing decisions make up a better new strategy. The new strategy is tested with newer strategies. The best performing decisions are used again to formulate an even better new strategy.

In an embodiment of the present invention, the financial institution tracks the performance of each new value tags-based decision strategy. Reports are created by matching a treatment action and a value calculation with subsequent customer behavior. Decision effectiveness reports show the performance of treatment actions. Algorithm validation reports show how well the value algorithms predict future customer value. The decision effectiveness reports show results by customer segments, report groups, and test groups. Numerous customer behaviors are measured, such as average account balance, average interest earned, delinquency rate, and attrition.

In an embodiment of the present invention, the reports contain report elements, such as a customer segment, which is the customer group as determined through the tags; a report group, which is a sub-segment of the customer segment defined through one or more customer attributes; a decision period, which is the period during which treatment actions were executed; a performance period, which is the period during which customer behaviors were recorded; and a report date, which is the date on which the report was created. The report also includes such report elements as the number of customers assigned the decision specified by the report group and the test group; the average loan balance of customers in each test group; the average interest and fees earned from the customers in each test group; the delinquency rate, which is the percent of customers who have gone delinquent during the performance period; and the average charge-off, which is the total charge-off amount divided by the number of customers in the test group. Finally, the report includes a report element for attrition, which is the percent of customers who closed an account during the performance period. Such reports are generated for each of the report groups for all of the specified customer segments. This report is generated periodically, for example, weekly, monthly, or quarterly. The objective is to accumulate a meaningful amount of performance data for each treatment action that is executed.

In an embodiment of the present invention, the tags algorithms are validated through reports that show how well they predicted customer behavior. In the case of value tags, future expected value for customers are recorded, and subsequent behaviors of customers are measured to obtain the actual customer value. For example, a future value algorithm validation report has a future value column in which customers are segmented by the future value which they were assigned a predetermined number of months ago. The future value column typically shows that a number of customers were expected to have negative future values. Those customers are tracked over the subsequent months, and their actual value for the predetermined number of months is determined. An algorithm with high correlation of future value and actual value are deemed to be predictive. The composition of the actual value is broken out into the total revenue minus total cost. Total revenue includes, for example, fees and interest income, while costs include, for example, charge-offs, collection costs, and transaction costs. Other types of predictive algorithms for propensity to buy and attrition are validated as well. Hence, customers are tracked over time to verify whether the algorithm correctly predicts their actual behavior.

In an embodiment of the present invention, the system software engine creates the value tags and assigns the appropriate customer treatment actions. The value tags engine has table-driven flexibility, as well as control group testing and performance tracking capabilities. The tags-based decisioning process begins with the determination of the current and future customer values in the value tags engine. These value tags are then used by the engine to segment the customer base and to formulate appropriate customer treatment actions. The resulting values and the associated customer treatment actions are written to the financial institution database, where they are available for use by other on-line or batch application systems of the financial institution. The treatment actions can also be written to a staged treatment action file. The assessment driver has both batch and on-line processing capabilities. The main objective of this processor is to initiate the evaluation of the customers that reside on the customer database. The processor uses triggers to determine when a particular customer or group of customers should be assessed. During off-line processing, the assessment driver extracts data from the customer database on a periodic basis. This process is designed to occur as frequently as desired. However, certain significant events require the re-evaluation of a particular customer within the pre-defined period. For example, an event such as bankruptcy may be encountered during the on-line risk-based assessment for a new product. In that case, a record is written to the assessment driver, thus triggering the re-evaluation of the customer during the next batch cycle.

In an embodiment of the present invention, the main objective of the assessment engine is to assess the customers (which includes creating the value tags), determine the appropriate treatment actions, and record customer data for performance reporting. Hence, the assessment engine evaluates the customers using the value tag algorithms and other table-driven parameters such as decision trees or matrices. The resulting tags are then used to segment the customers and to formulate the appropriate treatment actions. The acquisition treatment actions are determined for reactive or proactive interactions with the customer. The treatment instructions, which contain fields, are sent to the appropriate target systems, such as the customer database, and/or the staged treatment action file. The assessment engine sends a file to the tags driver. The engine is also capable of generating multiple files to support multiple functions or processes. For example, an acquisition-specific file containing proactive cross-sell opportunities is created for the direct operations of the financial institution.

In an embodiment of the present invention, the tags driver is triggered by the assessment engine. The main objective of the tags driver is to format the assessment engine instructions which are written to the customer database. The tags driver formats the instruction from the assessment engine and writes the appropriate information to the customer database. The data written to the customer database includes historical values from previous assessments of the customer, as well as the most recent values derived by the assessment engine. To accomplish this objective, the tags driver retrieves the treatment data from the customer database and updates the record with the new customer treatment. Some of the data elements include customer current value calculated for the present value, which is stored in one field, with previous values maintained in other fields, as well as customer future value, which is the recently derived expected value to the financial institution for a predetermined number of months in the future, with previous values maintained in other fields.

In an embodiment of the present invention, for existing customers, the customer treatment actions are determined by the assessment engine. These treatment actions are then incorporated into the subsequent on-line decisioning process. To accomplish this, the system accesses the customer database and retrieves the treatment actions. The treatment actions are then passed to the on-line assessment engine, where they are used in conjunction with account-based decision strategies. After a loan is decisioned, the system writes both the customer treatment actions and the final decision to the staged treatment action file. If a significant event is detected during the processing of a credit application, the customer treatment actions are overridden. Moreover, a trigger is written to the assessment driver to initiate the re-evaluation of the customer during the next batch assessment process.

In an embodiment of the present invention, during on-line processing, the acquisition system accesses the customer database and retrieves the treatment actions. If the current treatment data is not available on the staged treatment action file, the acquisition system invokes the on-line assessment engine to perform customer evaluation and application decisioning, which includes risk score calculation, line assignment, disaster processing, and the like. In addition, the value tags are utilized in decisioning whenever applications are processed for existing customers. The result of the acquisition evaluation is returned to the acquisition system. In the on-line environment, the assessment engine and the acquisition system facilitate the creation and update of the customer treatment instruction on the staged treatment action database. When an existing customer receives a final acquisition decision, the decision is recorded on the staged treatment action file. The customer data from the staged treatment action file is used for subsequent on-line evaluation, if the customer requires additional decisioning. The data on the staged treatment action file is also used for performance reporting.

In an embodiment of the present invention, fields are populated for financial institution actions, which indicates if a particular treatment action has been executed on the customer, and customer response, which indicates if the customer accepted or rejected a particular product offer or other treatment action. When significant events such as bankruptcy are encountered during on-line processing, the acquisition system writes a trigger to the assessment driver to initiate the re-evaluation of the customer in the next batch run. During the off-line customer assessment process, the assessment driver retrieves customer and product data from the customer database and other sources. The consolidated customer data is passed to the assessment engine, where it is evaluated to determine the treatment actions. The tags driver formats the instruction from the assessment engine and writes the appropriate information to the customer database.

In an embodiment of the present invention, in the on-line environment, the assessment driver is invoked to initiate the re-evaluation of an existing customer. This process is used to supplement the batch assessment process and thereby refresh the treatment actions if new and significant data is available. An on-line re-evaluation is an alternative to the systematic override of the treatment actions that were derived in a previous off-line assessment. During the on-line assessment process, the assessment driver is invoked by an on-line trigger when significant information is received. A request is sent to the customer database to retrieve the customer account information and all other data elements necessary for the assessment, and data is also retrieved from other sources such as credit bureaus. The on-line assessment engine is invoked to generate the tags and their associated treatment codes and strategies. The treatment codes and tags are written to the staged treatment action file, where they are accessed by the acquisition system. The nightly assessment batch process consolidates the staged treatment action file with the customer treatment actions and updates the customer database. The on-line assessment engine is invoked to perform application decisioning, and the result of the acquisition evaluation is returned to the acquisition system.

In an embodiment of the present invention, when a customer tags-based assessment is performed on-line, the acquisition system continues to process the application without directly waiting for the assessment to complete. Therefore, users of the acquisition system perform other tasks while the assessment is executing in the background. At the completion of the assessment, the acquisition system is notified, and the appropriate on-line processing occurs. The acquisition system retrieves customer treatment information from the customer database. In addition, the staged treatment action database is updated with final status information for all applications decisioned on the system.

In an embodiment of the present invention, the customer database is used as the basis to generate acquisition reports, since all servicing systems typically populate the customer database where the value-based treatment is also stored. The external data sources include the customer database, servicing systems, and other systems that provide historical, accounting, and transaction data. The treatment data was previously derived from the assessment engine, and the final action is retrieved from the staged treatment action file. On the assessment engine workstation, a user enters the observation/performance periods on which to generate reports. These tables, along with other decisioning strategies, are then uploaded to the mainframe computer for use by the assessment engine. The batch reporting process starts by merging the final actions from the acquisition system, the treatment data, an internal master file, and the servicing system data from the customer database into one output file. Next, a summarize performance data process selects records that fall within the observation/performance ranges that were uploaded from the server. Finally, the number of accounts at each value level are summarized and written out. These final datasets are then downloaded to the server platform. Once the datasets have been downloaded to the server, the user initiates the database table load process to convert the datasets and insert the records into a structured query language database. When the data is loaded into the server database, the reporting system retrieves the information and produces the algorithm validation report and acquisition decision effectiveness report. A report is also created to show acquisition treatment codes used in the batch assessment engine. This report is used to ensure that all acquisition codes sent to the acquisition system are valid.

Referring now in detail to an embodiment of the present invention, an example of which is illustrated in the accompanying drawings, FIG. 1 shows a simple overview of the key components of the method and system for evaluating customers using customer relationship value tags for an application of an embodiment of the present invention. Customer information database 2 is the collection of financial institution customer information stored in a computer storage medium. A computerized assessment system 4 processes customer information from database 2, assesses the customer's value to the financial institution, and assigns appropriate treatment actions. Other financial institution computer systems 6 process and load customer value data from the assessment system into appropriate customer value database files. Reports relating to information concerning customer assessments and associated treatment actions are generated for financial institution representatives by print servers 8 and accessed by financial institution representatives, for example, on a financial institution computer terminal 10. The information concerning customer assessment and associated treatment actions is used by other computer systems of the financial institution, or by representatives of the financial institution interacting with a customer 12, for financial institution activities such as marketing 14, acquisition 16, servicing 18 and collections 20.

In an embodiment of the present invention, present and future values are calculated for every retail customer on the customer database of the financial institution. In addition, present value is calculated for every bankcard-only customer. The present value algorithm uses customer data from a predetermined number of previous months. The present value indicates the value of a customer to the financial institution today, while the future value forecasts the value of a customer a predetermined number of months in the future. A customer is scored by one of a plurality of predefined future value algorithms, depending on the customer's present value and other attributes. Customer values are used to improve the acquisition decisioning processes on applications from existing customers. All existing customers are assigned test groups, scored, and segmented. Value scores are used to distinguish customer segments designated, for example, A, B, C, and D. Higher value customers, for example, in segments A and B, are given favorable treatment in score decisions and higher line assignments. The customers who are assigned to the control test group are processed through the existing acquisition decision processes of the financial institution. The customers in the test group are processed through value-based decision processes. The effectiveness of the two decisioning processes are then compared. The performance (e.g., customer net revenue, delinquency, and value) of the customers in the control and test groups are recorded and stored, and reporting is used to compare the performance of the two test groups.

Figure 2:
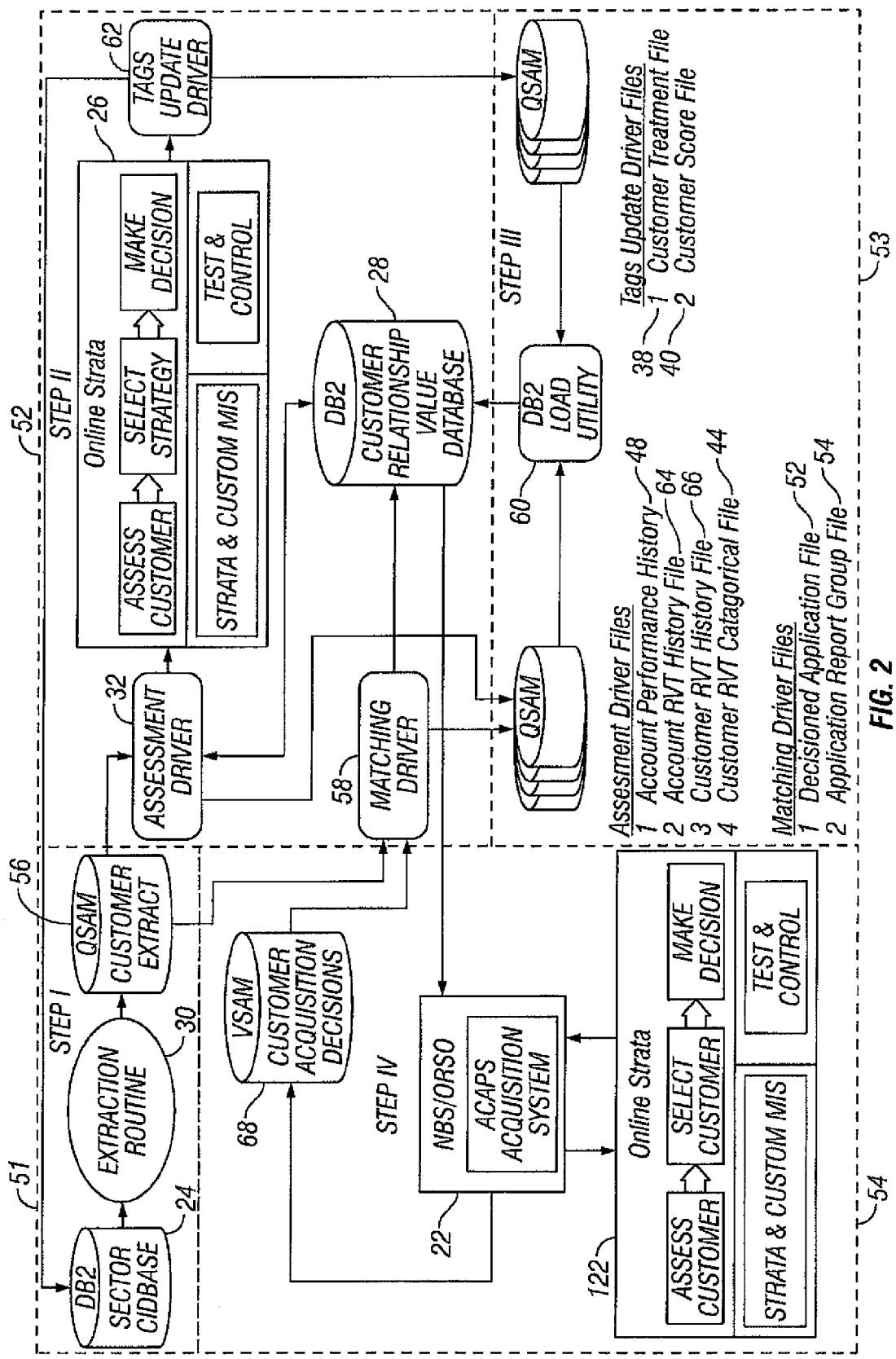
FIG. 2 is a schematic diagram illustrating further detail of the system components and processing steps of the customer relationship value tags process for an embodiment of the present invention.

FIG. 2 is a schematic diagram illustrating further detail of the system components and processing steps of the customer relationship value tags process for an embodiment of the present invention. The acquisition system 22, the customer information database 24, and the customer relationship assessment engine 26 are used to implement the customer tags. The acquisition system 22 is a mainframe credit processing system internal to the bank in this example. The customer information database 24 provides the customer data necessary to create the tags. The assessment engine 26 creates the tags, segments the customer population using the tags, and assigns the appropriate customer treatment actions. The assessment engine 26 also provides a flexible capability to conduct control group testing and algorithm validation.

Whenever an existing customer enters the loan acquisition process, the acquisition system 22 accesses the customer relationship value database 28 and uses the value-based treatment actions for loan evaluation. As seen in FIG. 2, the creation and use of customer relationship value tags includes various steps. At S1, customer information is extracted from the customer information database 24 by extraction routine 30. The assessment driver 32 uses the customer-extract information to create a transaction file 56. At S2, customer assessment is performed by batch processing of the customer extract file 56 by the assessment engine 26. During the assessment process, the assessment engine 26 calculates the customer's value and assigns the appropriate treatments for loan acquisitions. At S3, assessment engine 26 instructions and assessment driver 32 output records are batch processed to load data into the appropriate tables on the customer relationship value database 28. At S4, the treatments are used on-line in the acquisitions process.

In an embodiment of the present invention, the assessment engine 26 calculates a present value and a future value for each customer (except for "bankcard only" customers, for which only a present value is calculated). Predefined customer value models employ current month's data and a predetermined number of previous months of historical customer and product data to arrive at a weighted customer value. Since the value models must be implemented in a practical manner the use of historical data is incremental. With the incremental approach the calculation is based only on the current customer information that is available on the customer information database 24 and the historical data available on the customer relationship value database 28. Hence, only current customer database data is used when present and future values are calculated for the first time. Subsequent customer value calculations utilize current data as well as information used in a predetermined number of the most recent evaluations. This is accomplished by storing each month's historical attributes and the calculated customer values on the customer relationship value database 28.

In an embodiment of the present invention, each customer on customer information database 24 is assessed on a periodic basis. To facilitate timely and consistent assessment, the relationship value tag environment is designed to either process a small percentage in each batch run or the entire customer base in a single batch run. Table-driven parameters control the number of customers that are processed through the assessment engine 26 on each batch run. FIG. 3 is a list of customer relationship value database tables 34 for storing value tag information for an embodiment of the present invention. The calculated value tags, customer treatment information, and customer performance data are stored on the customer relationship value database 28, which is segmented into tables 34. Tables 34 are updated by the assessment engine 26 and the associated relationship value tag processes. Each of tables 34 has a unique primary key to provide direct access to the stored data. In addition, some of the tables have foreign keys to facilitate joins to other tables within the database. Each customer has a customer number, which is the customer's ID as recorded on the customer information database 24. This number is unique for each customer. Referring to FIG. 2, the relationship value tag environment is also supported by the customer extract file 56, which is created by the customer information database 24 each month. Customer extract file 56 is populated with relationship value tag-related customer and account level data. Two record types are present on customer extract file 56, namely, customer extract records and customer account records. The records are keyed by customer ID and a unique record type. There is a single customer extract record for each customer. There are, however, one or more customer account records for each customer.

In an embodiment of the present invention, during the data extraction process, the necessary data elements are retrieved from tables in the customer information database 24. Customer information database 24 stores customer demographic, financial, application, and transaction data on existing financial institution customers. All customers are retrieved for relationship value tag processing. On a periodic basis, the customer information database 24 is updated with data from financial institution servicing systems. By the completion of the customer information database load process, the customer data is typically a few days to a few weeks behind. After the normal customer information database periodic load, structured query language queries are used to extract relationship value tag-specific data elements. These elements are then loaded into the customer extract file 56 as shown in FIG. 2. The assessment driver utility 32 accesses the customer extract file 56 and the customer relationship value database 28 to generate transactions, activities, and extracts for processing by the assessment engine 26. The number of customers processed by the assessment driver 32 is controlled by user-specified parameters on predefined relationship value tag parameter tables. The customer relationship assessment engine 26 is invoked to evaluate the customer records prepared by the assessment driver 32.

In an embodiment of the present invention, during an assessment, the assessment engine 26 generates customer value scores and acquisition treatments for every customer evaluated. Referring to FIG. 3, this information is written to an assessment engine 26 instruction file which is used to update an assessed customer table, Assessed_Customer 36, a customer treatment table, Customer_Treatment 38, and a customer score table, Customer_Score 40, on customer relationship value database 28. Before the assessment engine 26 assessment process, matching driver 58 is invoked to evaluate applications on a customer decision file 68 which is produced by the acquisition system 22. When a match is found on the customer information database 24, customer extract file 56 records are formatted and written to associated sequential files for a decisioned customer table, Decisioned_Customer 50, a decisioned application table, Decisioned_Appl 52, and application report group table, Appl_RPT_Group 54. A database load utility 60 is then used to bulk load the data into the appropriate tables on the customer relationship value database 28. A tags update driver 62 reads the assessment engine 26 instruction file and produces a sequential file to transfer data to the appropriate system or table on the customer relationship value database 28. Tags update driver 62 also creates a sequential file to update the customer information database 24. One record is written for each customer, with household number and customer number as the key. Both the present value and future value are returned to the customer information database 24.

In an embodiment of the present invention, a predetermined number of months of calculated values and associated customer data are used for subsequent evaluation of customers. Database load utility 60 is executed to update the customer relationship value database 28 with information generated by the assessment engine 26 and the assessment driver 32. The database load process maintains a predetermined number of history records on the customer treatment table, Customer_Treatment 38, the customer score table, Customer_Score 40, and account performance history table, Acct_Perf_History 48, as shown in FIG. 3, as well as an account relationship value tag history table, Acct_RVT_History 64, and a customer relationship value tag history table, Cus_RVT_History 66, as also shown in FIG. 3. A table-driven parameter controls the number of history records maintained for each customer. The customer treatment table, Customer_Treatment 38, is accessed by acquisition system 22 whenever an existing customer applies for a new product, and the customer's name and social security number are used to locate a customer treatment record. If a record is found, the assigned customer value segment is used by the on-line assessment engine 26 to perform an evaluation for line assignment and lower score cut-off. Whenever a set-up activity code is entered on an approved application, the acquisition system 22 writes a record to the customer acquisition decision database 68. This record is used to identify the customer on the customer information database 24 to facilitate performance tracking.

Figure 4:
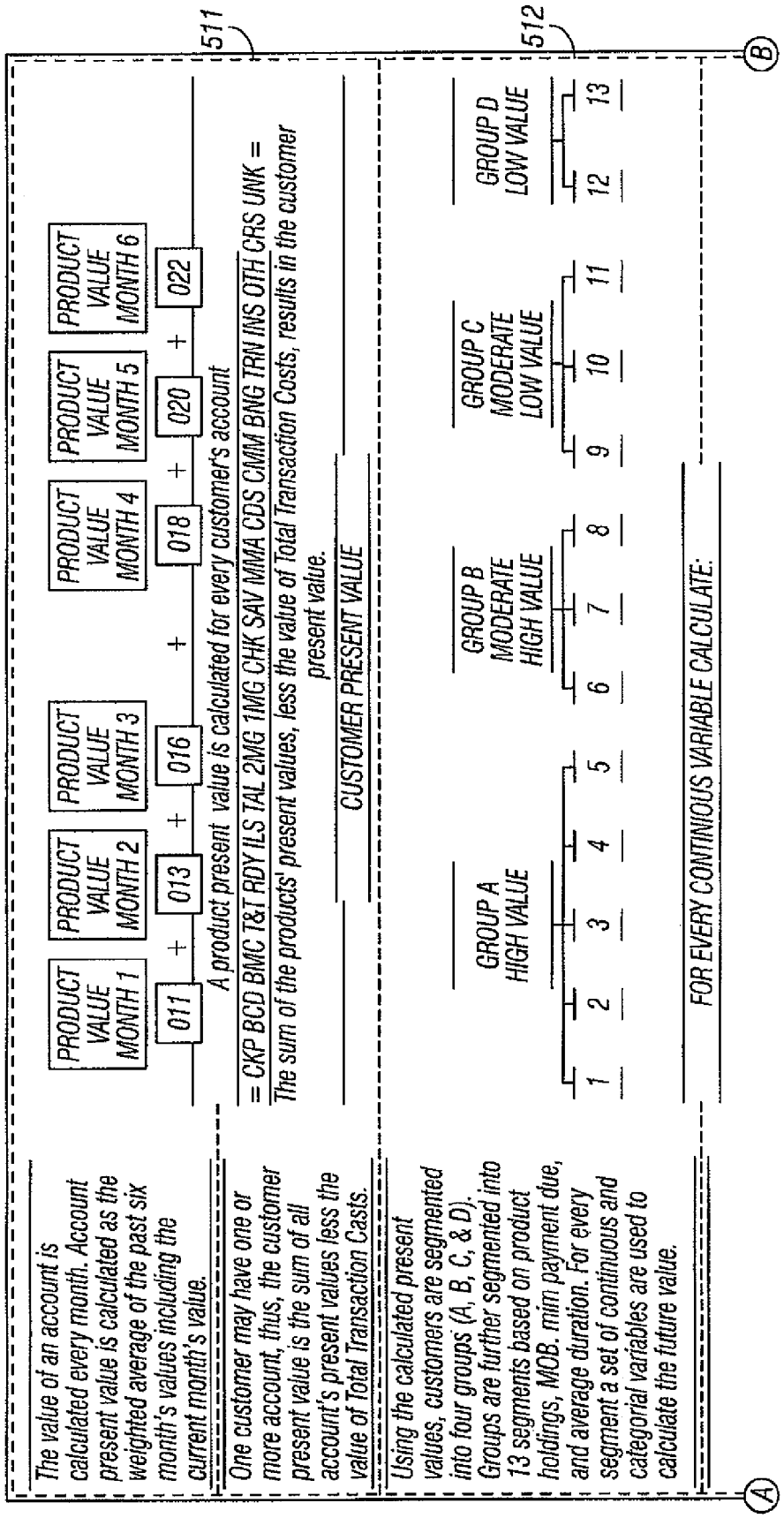
FIG. 4 is a schematic diagram showing further detail of the value model processing performed by the customer relationship assessment engine for an embodiment of the present invention.
Figure 4:
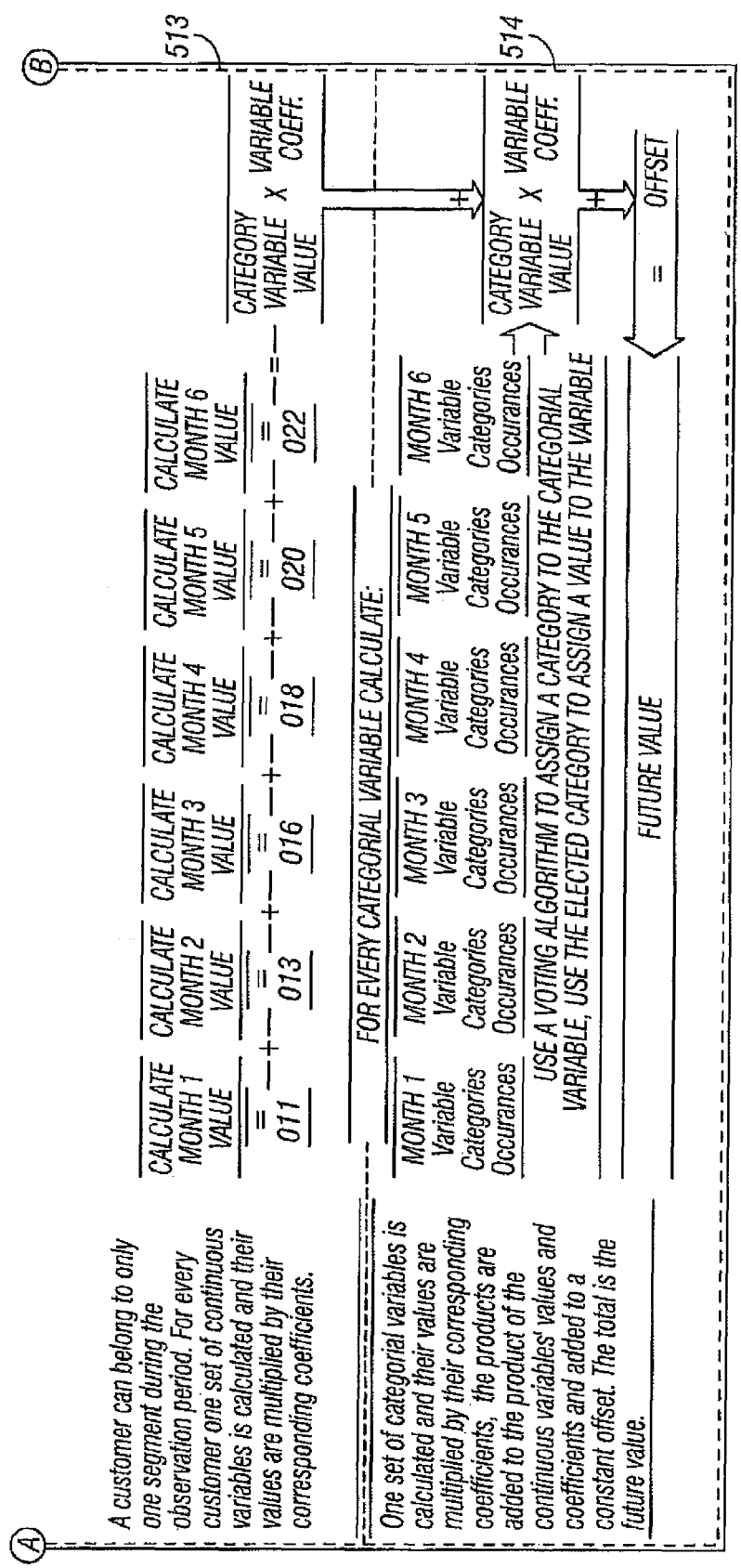
Figure 5:
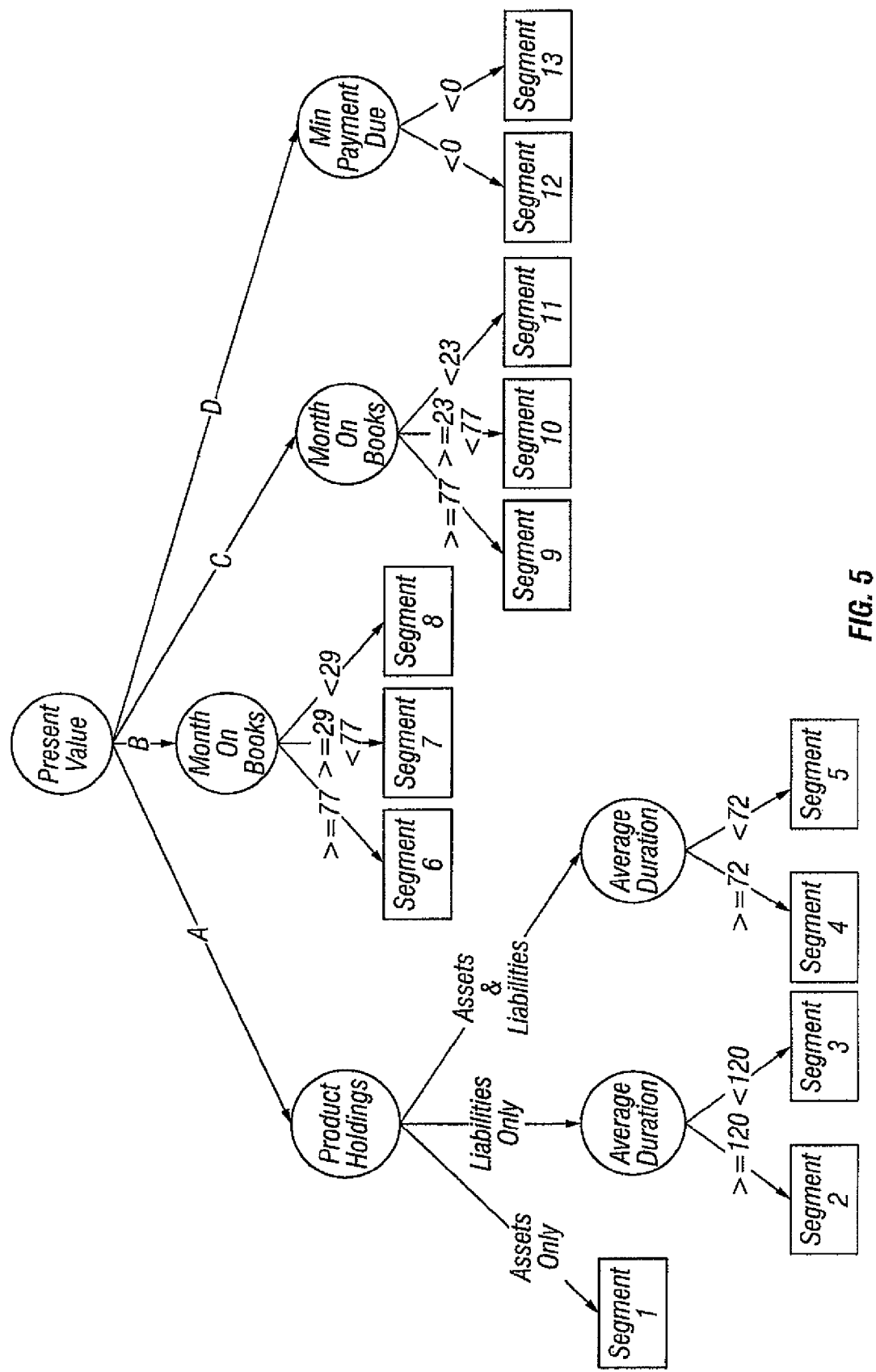
FIG. 5 is schematic diagram showing further detail regarding the segmentation of customers in the value model processing for an embodiment of the present invention.

In an embodiment of the present invention, two models are used to calculate the present value and future value of financial institution customers. The models are executed using customer information database 24 data. FIG. 4 is a schematic diagram which provides further detail regarding the value model processing performed in the customer relationship assessment engine 26 for an embodiment of the present invention. The calculation of the present and future values for a customer is performed as follows. For every financial institution product that a customer holds, a current value for that product is calculated at S11. The present value of the product is also calculated as the weighted average over a predetermined number of months, including the current month. The present value of the customer is the sum of all of the present values of the customer's products less the value of total transaction costs. At S12, the customers are categorized according to their present values into four segments, namely, "A" for high value customers, "B" for moderately high value customers, "C" for moderately low value customers, and "D" for low value customers. Customers are further categorized into a number of segments using a hierarchy. FIG. 5 is a schematic diagram showing further detail regarding the segmentation of customers in the value model processing. The segmentation is used to select a model to calculate a future value for the customer. For every one of customer segments A, B, C, and D, a set of continuous variables is calculated at S13, and a set of categorical variables are calculated at S14. The values of the respective variables are multiplied by their corresponding coefficients, and the results are added to the offset for the segment. The total is the future value of the customer for the predetermined number of months ahead.

In an embodiment of the present invention, the calculation of the customer present value is done by the assessment driver 32 using data from the customer information database 24, a customer future value history file, an account present value history file, and an assessment engine 26 parameter table. The assessment driver 32 writes the customer present value to an assessment engine 26 extract file that is the input to the assessment engine 26. For calculation of the customer future value, all the customer-level variables used to calculate the future value, are calculated by the assessment driver 32. The assessment driver 32 writes these values to the assessment engine 26 extract file that the assessment engine 26 uses as an input to a future value models calculations. The calculations for future value models are implemented in the assessment engine 26 as user exit score models. The present value model uses a number of predefined parameters that will have different values for each financial institution and may change from time to time. To ensure maximum flexibility, the present value model parameters are established in the assessment engine 26 before an actual customer assessment is first executed to generate the relationship value tag parameters in the form of a record layout. The parameters are written to a file, where they are retrieved by the assessment driver 32. The relationship value tag parameters are implemented in the assessment engine 26 user interface. The relationship value tag tables are loaded to a mainframe computer where they are prepared for subsequent execution of the assessment driver 32.

In an embodiment of the present invention, for any one month the current value for an account is represented by the following equations:

$$v_{ml} = CNR_{ml} \cdot M(mob_{ml}) \cdot g_{ml} \cdot f(N)$$

$$v_{ma} = [CNR_{ma} - x \cdot Bal \cdot p_{default}(\text{bucket})] \cdot M(mob_{ma}) \cdot g_{ma} \cdot f(N)$$

$$v_{mc} = CNR_{mc} - Bal_{mc} \cdot pb(mscore_{mc})$$

In the foregoing equations;
- $v_{ml}$, is the current value for a liability product at month m;
- $v_{ma}$, is the current value for an asset product at month m;
- $v_{mc}$, is the current value for a bankcard product at month m;
- $g_m$, is a predefined coefficient adjusting $v_{ma}$ and $v_{ml}$ values for direct access or direct deposit;
- $M(mob_{ma})$ and $M(mob_{ml})$, are predefined functions adjusting $v_{ma}$ and $v_{ml}$ values for months on book;
- x, is a predefined constant adjusting the account balance by a percentage depending on the type of product;
- $p_{default}(\text{bucket})$, is a predefined coefficient adjusting the account balance for the probability of default according to the type of product and the account current bucket, a number of cycles past due; and
- f(N), is a predefined coefficient, which is a function of the number of products per account.

The equations are used every month to calculate the current value of each of the customer's accounts. The resulting current value is used in the calculation of the product present value and passed to the customer future value history file for use in the calculation of the following month's present values. The customer future value history file stores current values for a predetermined number of past months, including the current month, for each of the customer's accounts.

In an embodiment of the present invention, to calculate all the elements of the foregoing equations, a number of steps are performed for every customer. A predefined numerical value is assigned for g, according to whether or not the account is direct access or direct deposit, with a direct access or direct deposit account having a higher numerical value than a non-direct access or non-direct deposit account. A g value is determined for every account of the customer. If the account has a direct access or direct deposit, its g value is assigned one numerical value. If the account does not have direct access or direct deposit, its g value is a different numerical value The value of g for every account is calculated by the assessment driver 32. FIG. 6 is a table showing the sources of variables for all of the elements used in the equations for calculating the present value of a customer for an embodiment of the present invention, including the source for g.

In an embodiment of the present invention, to calculate the months-on-books function, M(mob), the product month-on-book is first calculated using the following equation.

$$mob = \text{Current date} - \text{Product Open Date}$$

Then, using mob, the function M(mob) is calculated as follows:

$$\frac{mob}{M(mob) = \text{MIN}[2, (1+360)]}$$

In an embodiment of the present invention, the function f(N) is calculated using the following equation for the current month, one value per customer:

$$f(N) = \begin{cases} 1 & \text{if } N = 1 \\ 2 & \text{if } N \geq 6 \\ 0.875 + \dfrac{1.25}{1 + \text{EXP}(3.0758 - 0.8788 \cdot N)} & \text{if else} \end{cases}$$

The value for f(N) is a function of the total number of products, N, during the current month.

In an embodiment of the present invention, the x variable is a predefined product-type coefficient for asset accounts, and $P_{default}(\text{bucket})$ is the probability of going to default from a particular delinquency status. A predefined $P_{default}$ value is given for every asset account type.

In an embodiment of the present invention, the formula for calculating $P_b(mscore)$, which is calculated for bankcard accounts, is as follows:

$$P_b(mscore) = (100 - mscore)/(100 + 19 \cdot mscore)$$

In an embodiment of the present invention, the formula for calculating customer net revenue (CNR), which is done for every product, is as follows:

$$CNR = \text{Fee} + \text{Balance}(c_1 \text{ Interest} + c_2) \text{num-days-in-curr-month}/30$$

Values for $C_1$ and $C_2$ are predefined by product type.

In an embodiment of the present invention, the current value for every account is denoted by "v," where:

$$vma = (CNR - x \cdot \text{Balance} \cdot p_{default}) \cdot M(mob) \cdot g \cdot f(N);$$

$$vml = CNR \cdot M(mob) \cdot g \cdot f(N);$$

$$vmc = CNR - \text{Balance} \cdot P_b(mscore).$$

Where:
- $v_a$ is the current value for an asset product (a current value is calculated for every asset product);
- $v_l$ is the current value for a liability product (a current value is calculated for every liability product);
- $v_c$ is the current value for a bankcard;
- CNR is customer net revenue for an account;
- $M(mob_a)$ is a function of $mob_a$; and
- $M(mob_l)$ is a function of $mob_l$.

In an embodiment of the present invention, the formula for calculating txn is as follows:

$$txn_m = TXN_m \cdot \overline{M(mob)_m} \cdot f(N)_m$$

A txn value is calculated every month.

In an embodiment of the present invention, the present value for an account is calculated using the following formula:

$$V = \sum_{m=1}^{6} c_m \cdot v_m$$

Where,
- $v_m$ is the account value for month m.
- $c_m$ is the account weight for month m.

In an embodiment of the present invention, the formula for calculating the present value of txn is as follows:

$$AVG-CUS-TXN = \sum_{m=1}^{6} c_m \cdot txn_m$$

In an embodiment of the present invention, the customer present value is calculated using the following formula:

PRSNTVAL=TOT-ACCTS-PVAL-AVG-TXN

Where TOT-ACCTS-PVAL is the sum of present values as calculated for every account.

In an embodiment of the present invention, future value models are implemented in the assessment engine 26 tables as score models. One score model is developed for every one of the predetermined number of customer segments. The future value model attributes used in the score model are calculated by the assessment driver 32 and passed to the assessment engine 26 on the account extract. For every score model, a set of predefined variables, coefficients, and offsets are used to calculate the raw score. Every score model has one offset but several variables. Each variable value is multiplied by an associated coefficient, and the sum is added to the score model offset. The formula for calculating the raw score is:

$$FV, \text{raw score} = a_o + \Sigma_i a_i \cdot x_i$$

Where,
$a_o$ is model offset
$a_i$ is variable coefficient
$x_i$ is variable value Their are two types of variables used in the raw score equation, namely, continuous variables, and categorical variables. Although there are a predetermined number of score models, the set of variables used for each model is not unique to that model. A variable is often used in several score models. FIG. 7 is a table showing the equations used to derive the values for the continuous variables for an embodiment of the present invention.

FIG. 8 is a table showing the sources of variables used in the equations for calculating the future value of a customer for an embodiment of the present invention. In an embodiment of the present invention, the number of asset accounts, ASSTNUM 70, that the customer holds is summarized, by the assessment driver 26. The average asset balance, AVGBAL 72, is the weighted average of the total asset balance during a predetermined number of past months, including the current month. A maximum asset balance, MAXABAL 74, is also determined. For every asset product there is a mean balance. The mean balance values are used to calculate the average asset correlation balance, AGACBAL 76. For every asset product there is a mean interest. The mean interest values are used to calculate the average asset correlation interest, AVGACINT 78. The number of liability accounts that the customer holds is summarized by the assessment driver 32, and the average number of liability accounts, LIABNUM 80, is calculated. The average liability balance, AVGLBAL 82, is the weighted average of the total liability products balances during the past six months, including the current month.

In an embodiment of the present invention, the maximum liability balance, MAXLBAL 84, is also determined. For every liability product there is a mean balance. The mean balance values are used to calculate the average liability correlation balance, AVGLCBAL 86. For every liability product there is a mean interest. The mean interest values are used to calculate the average liability correlation interest, AVGLCINT. The average liability fee, AVGLFEES 88, is the weighted average of liability fees for a predetermined number of past months, including the current month. The footings, FOOTINGS 90, is calculated as the average asset balance less than the average liability balance. The maximum household total credit limit, MAXHHTCL, is also determined. Other calculations include maximum household bankcard credit limit, MAXHHBCL 94; average household median income, AVGHHMED 96; average household number of accounts open, AVGHHOPN; average household total balance, AVGHHBAL 100; average minimum payment due, AVGMNPMT 102; average customer net revenue, AVGCNR 104; average delinquency days, AVGDLQ 106; average duration, AVGDUR 108; average total credit limit, AVGTCRLM 110; oldest product months on book, OLDSTMOB 112; total maximum bucket, MAXBUCKT 114; average maximum bucket, AVGMXBKT 116; and household oldest member, HHOLDMBR 118.

In an embodiment of the present invention, a categorical variable is assigned a value according to the category to which it belongs. For example, a variable number can fall into any of several categories. If the variable belongs to a particular category, it will be assigned a value according to a predefined table. However, because the future value model uses a window of a predetermined number of months, a voting procedure is used to assign a category to the categorical variable according to a predefined table of months, weights, categories, number of occurrence times, and weighted averages. A weighted average occurrence is calculated for each of the variable number categories. The weighted average occurrence is calculated using the following formula:

$$\text{Weighted Occurrence} = \sum_{m=1}^{6} wt_m \cdot c_m$$

Where,
wt is the weight for every month.
$c_m$ is the number of occurrences during month m.

The same formula is applied to all categories, according to a predefined table. Predefined categorical variables, their categories and corresponding values and coefficients are used in the calculation. The voting algorithm is implemented on assessment driver 32. Assessment driver 32 passes a winning category to the account extract of assessment engine 26 for every categorical variable. The data elements involved in the calculation of the categorical variables categories are predefined. After calculating the values for all continuous and categorical variables of each segment, each variable is then multiplied by its coefficient. The products are summed up, together with the offset, to calculate the future value.

In an embodiment of the present invention, the goal of the value-based acquisition strategies of the financial institution is to enhance revenues and profits through the effective use of customer value in the acquisition decisioning process. The decisioning process is tailored toward the value profile of an existing customer. High value customers are treated in ways that maximize revenues and profits. The customer treatment, value profile, and the resulting customer behavior are recorded monthly, so that the information is available for reporting. The customer relationship assessment engine 26 calculates customer value scores and segments the existing customer base. The on-line assessment engine 122, as shown in FIG. 2, uses the scores and segmentation to execute value-based acquisition decisions.

Figure 9:
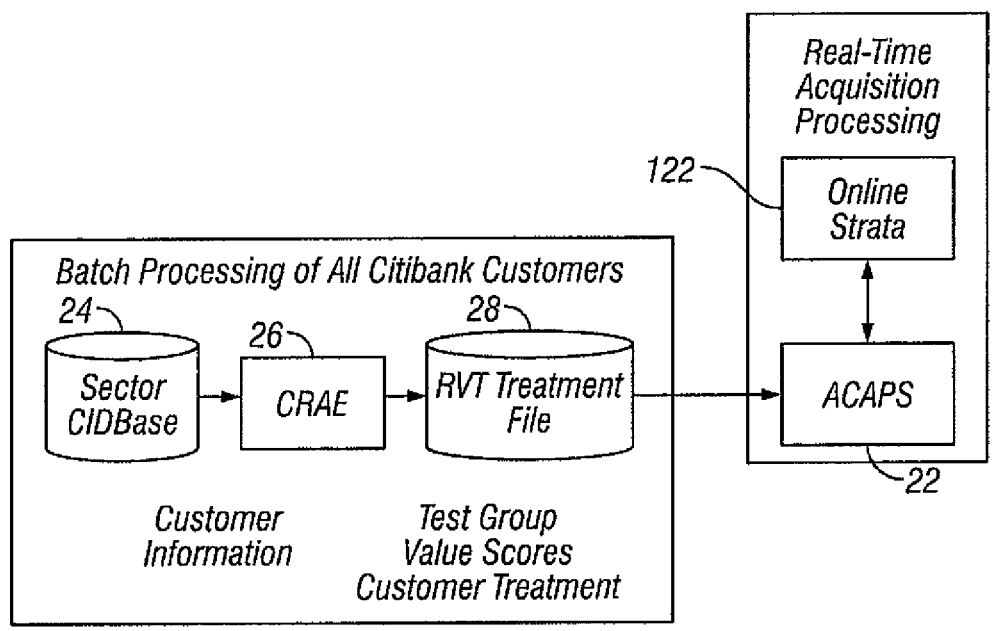
FIG. 9 is a schematic diagram which provides further detail regarding the value tags implementation process for an embodiment of the present invention.

In an embodiment of the present invention, value-based acquisition decisioning involves the integration of customer information database 24, the processing system (both batch 26 and on-line 122), and the acquisition system 22. FIG. 9 is a schematic diagram which provides further detail regarding the value tags implementation process for an embodiment of the present invention. Every month, customer information database 24 extracts information on existing financial institution customers and transmits a sequential file to the assessment engine 26. The information is at the customer level and includes the fields necessary to calculate the present and future value tags and to track the performance of the account holdings of a customer (e.g., customer net revenue for each account, balance amounts, delinquency, and the like). The assessment engine 26 randomly assigns the customers into test groups, scores the customers, and segments the customers based on the present value scores. The test group, value scores, and the customer segment information for each customer are written to the CUSTOMER_TREATMENT table 38 on customer relationship value database 28. Customer relationship value database 28 is made available for the ACAPS acquisition system 22 and other systems to access for value-based acquisition decisioning. The acquisition system 22 accesses the treatment file for existing customers who apply for credit. A test group and a customer segment are used to tailor the acquisition decisioning processes according to customer value. The value-based treatment is used in conjunction with or in place of existing credit acquisition strategies. Predefined assessment engine 26 tables are set up to implement and test acquisition decision strategies.

Figure 10:
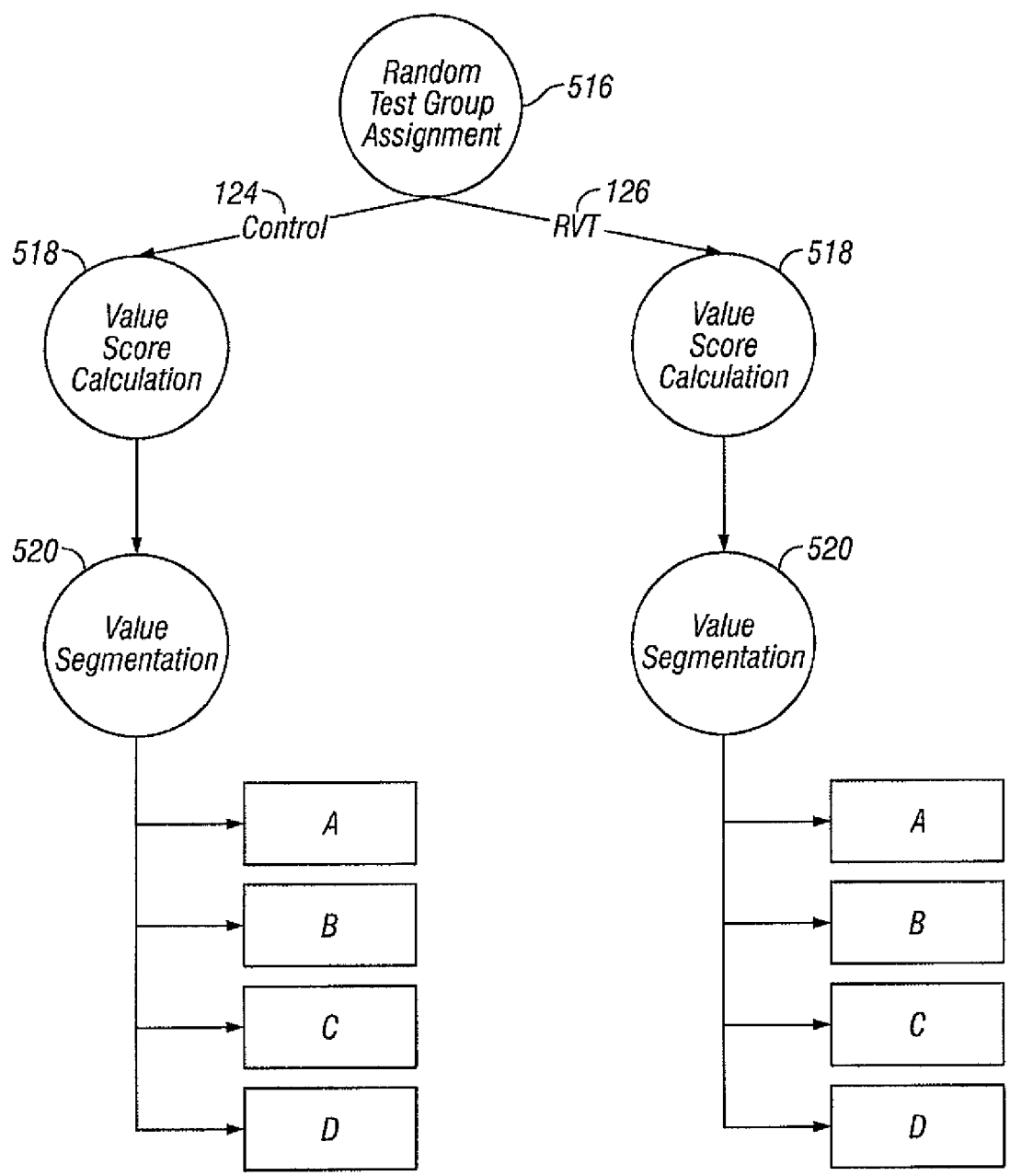
FIG. 10 is a schemative diagram showing further detail regarding the batch processing of test group assignment, value scoring, and segmentation processing for an embodiment of the present invention.

In an embodiment of the present invention, test groups are needed in order to improve the existing acquisition strategies. This is accomplished through control group testing, as follows: first, customers are randomly assigned to test groups; second, different acquisition strategies are applied to the test groups; and, third, the results are obtained and compared, and based on the results, new treatment actions are developed. FIG. 10 is a schematic diagram showing further detail regarding batch processing of test group assignment, value scoring, and segmentation processing for an embodiment of the present invention. At S16, customers are randomly assigned to one of two test groups, namely, control 124 and RVTI 126. A predetermined percentage of the accounts are assigned to control group 124, while the remaining accounts are assigned to RVTI group 126. Customers in control group 124 are subsequently processed by on-line system 122 using existing acquisition strategies. Although the control group 124 customers are given the same treatment regardless of value, they are segmented by value in order to track customer performance by value and for the flexibility of changing acquisition decisioning for specific value segments in the future. Customers in the RVTI test group 126 are later processed by on-line system 122 using new value-based acquisition strategies. After the test group assignment, all financial institution customers are scored for present value and future value at S18. At S20, the present value is used to assign customers into four segments: A, B, C, and D. For bankcard-only customers, only the present values are calculated.

In an embodiment of the present invention, all existing customers are processed by the assessment engine 26. FIG. 11 is a schedule showing tables implemented in the customer relationship assessment engine 26 for an embodiment of the present invention. For each customer, the assessment engine 26 generates the following information to be written to the customer relationship value database 28: present value, present value algorithm ID, present value segment, future value, future value algorithm ID, future value segment, and test group ID. In addition, the assessment engine 26 generates the parameters that are needed to calculate present value and to determine the number of accounts to be processed each day. Instruction layouts 168 associated with the parameters are predefined for each type of account. The system attributes 162 used to process the customers through the assessment engine 26 are grouped into four types, namely, attributes used to identify the customer and the assessment date; attributes used by the assessment driver 32 to determine the number of accounts to process each day; attributes used by the assessment driver 32 to calculate present value (the attributes used by assessment driver 32 to calculate present values make up the instruction layout for the customer parameter load which are all attribute trees); and attributes used by the assessment engine 26 to calculate future value.

In an embodiment of the present invention, for every future value score model, there are a set of predefined continuous and categorical variables and a predefined model offset. For each model variable, there are predefined values and coefficients. For the continuous variables and categorical variables, attribute trees are used to determine the values and coefficients. Customer value user exits are used to calculate future values for all financial institution retail customers. The assessment engine 26 is configured to utilize a predetermined number of user exit programs to derive the actual future values. To facilitate testing, the user exits generate score audit transactions for the models. The calculated score for the future value modes are placed in a reserved attribute. User exits are written to calculate future values. A different user exit is written for each of the predetermined number of future value models. The user exits follow the calculation logic as follows, as shown at S13 and S14 in FIG. 4, first, multiply the continuous variable values with the corresponding continuous variable coefficients; second, sum up the results; and third, sum the resulting sum with the values returned by the categorical attributes.

In an embodiment of the present invention, the on-line acquisition system assessment engine strategies use the value segments and tags in the acquisition decisioning process. For customers in control group 124, the pre-existing decisioning processes are used. For customers in the RVTI group 126, however, new processes are applied. The decisioning strategies for the RVTI customers varies according to the value segment. The decisioning processes are executed according to predefined parameters. The products affected by value tags include, for example, bankcards; checking (including line increases); equity accounts; installment loans; preferred lines; preferred loans; ready credit (including line increases); and second mortgages. Present value A and B customers receive higher matrix line assignment amounts with a maximum cap.

In an embodiment of the present invention, as a tool for enabling efficient storage and access to current and historical value tag information, the customer relationship value database 28 is used. To support the value tag architecture in terms of volume and processing efficiency, customer relationship value database 28 is implemented using, for example, a mainframe database management system. A treatment record is stored on each customer. In addition, historical treatment data and historical product data are stored for a predetermined number of months. To eliminate redundancy, data elements are separated into a number of distinct relational database tables. These tables are joined by foreign keys.

In an embodiment of the present invention, the customer relationship value database mainframe architecture is implemented to generate and store current and historical treatment data for customers across all products. Referring to FIG. 3, a list of sample customer relationship value database tables is shown. Each table in the customer relationship database management system contains specific information in a pre-defined table format. For example, the assessed customer table 36 contains identification data for each customer assessed by the assessment engine 26. Table 36 contains a record for each customer that was evaluated by the processing system. In particular, assessed customer table 36 contains information such as the segmentation strategy for each customer and the date of the customer's next assessment. For each customer, the assessment driver 32 inserts or updates a record on the assessed customer table 36. The data on assessed customer table 36 is updated each time the customer is assessed by the assessment engine 26. During the assessment, the next assessment date is written to the assessed customer table 36. This data is loaded using structured query language queries. A single record is stored for all customers.

In an embodiment of the present invention, the customer treatment table 38 serves as the customer treatment repository. It contains a predetermined number of records (one for each of a predetermined number of months) for each customer that was evaluated by the assessment engine 26. In particular, the customer treatment table 38 contains information such as the segmentation strategy for each customer. The assessment engine 26 generates a sequential transaction file to update the customer treatment table 38. The data on the customer treatment table 38 is updated each time the customer is assessed by the assessment engine 26. The customer relationship value database load utility 60 is used to bulk load the treatment transaction file into customer treatment table 38. A single record is stored for each customer. The customer score table 40 holds the assessment engine 26 calculated scores for the customer. Each customer contains a present value score, while financial institution retail customers also contain a future value score. The assessment engine 26 generates a sequential transaction file to update customer score table 40. The data on customer score table 40 is updated each time the customer is assessed by assessment engine 26. A predetermined number of monthly records are stored for each score calculated on all customers.

In an embodiment of the present invention, the customer future value continuous variables history table 42 contains the previous month's customer information. To effectively support the relationship value tag score models, a predetermined number of historical customer relationship value tag records are stored on table 42. After the assessment driver 32 accumulates the information for a customer, it writes a record to a future value continuous sequential file. The sequential file is then processed by the customer relationship value database load utility 60 routine. The data on table 42 is updated each time the customer is assessed by the assessment engine 26. Table 42 contains a predetermined number of records for each of the customers assessed by assessment engine 26. The customer future value categorical table 44 contains the previous month's counter for each categorical attribute used in the future value model. After the assessment driver 32 calculates the number of occurrences for each category associated with the categorical attributes, when the counter for a category is greater than zero, a record is written to a future value category sequential file. The sequential file is then processed by the customer relationship value database load utility 60 routine. The data on table 44 is updated each time the customer is assessed by assessment engine 26. Table 44 contains a predetermined number of records for each category found for a categorical attribute.

In an embodiment of the present invention, financial and other product specific data are stored for each application that was previously decisioned on the acquisition system assessment engine 26. This information is recorded each month when the customer is assessed. The data is stored in the account performance history table 48 for a predetermined number of months. The assessment driver 32 adds a record to the account performance sequential file for each application owned by an acquisition system assessment engine decisioned customer, even if the specific account was not decisioned by the acquisition system 22. The data used to create table 48 comes from the customer information database 24 customer account record on the customer extract 56 file. Information is added to account performance history table 48 if the customer has been value tag-decisioned and the decisioned date on the customer decisioned customer table is within the performance observation period. A customer with a value tag-decisioned account that is being tracked for a number of months will have the same number of account performance history records for each product owned.

In an embodiment of the present invention, the calculated customer net revenue and present value are stored for each application processed by the assessment engine 26. These calculated attributes are stored on the account current value history table 46 for use in subsequent customer value assessment. Data for a predetermined number of months is stored in table 46. The assessment driver 32 adds a record to the account current value sequential file for each application owned by the customer. Information is added to table 46 each time the customer is assessed by the assessment engine 26. A record is added for each account owned by the customer each month. A single record is stored to indicate that an account was decisioned for the customer. The decisioned customer table 50 is used to store the latest date on which a customer decision was made. The matching driver 58 inserts a record to decisioned customer table 50 whenever an application is booked for an existing customer. If a record already exists for the customer the matching driver 58 simply updates the decisioned customer record using structured query language queries. The relationship value database load utility 60 routine bulk loads the sequential file into decisioned customer table 50.

In an embodiment of the present invention, data is added to the decisioned application table 52 whenever an application is value tag-decisioned on the acquisition system 22. The data for each acquisition system value tag-decisioned customer is stored until the end of the observation period. When an account is decisioned on the acquisition system assessment engine 26 using value tag strategy, the performance is tracked for a predetermined number of months. The decisioned application table 52 is used to store the product code, account number, and tracking start date. The matching driver 58 writes a record to the decisioned application sequential file whenever an application is booked on the acquisition system 22. If the is account number is available in the acquisition system 22, the record is written immediately. On the other hand, when the account number is not available in the acquisition system 22, the record is written only when it is found on the customer information database 24 customer extract file 56. The relationship value database load utility 60 routine bulk loads the sequential file into table 52. Data is added to table 52 whenever an application is value tag-decisioned on the acquisition system 22. The data for each acquisition system-decisioned account is stored until the end of the observation period. Hence, a customer with a value tag-decisioned account that is being tracked will have a decisioned application record for the predetermined number of months.

In an embodiment of the present invention, report groups are used to track the impact of specific decisions on the value of a customer. A decisioned application may have multiple report groups. Hence, a record is stored on the application report group table 54. The matching driver 58 writes a record to the report group sequential file for each decision point specified on a booked application. The customer relationship database load utility 60 routine bulk loads the sequential file into table 54. Data is added to table 54 whenever an application is value tag-decisioned on acquisition system 22. The data for each report group is kept for a predetermined number of months.

In an embodiment of the present invention, data elements stored in various tables are required to facilitate the calculation of customer value. The assessment driver 32, for example, requires historical product values for a predetermined number of months to derive the customer's present value. Views are created to support this requirement. A product history view contains the calculated product value and product net revenue for a predetermined number of previous months for each product. The data is presented in ascending order with the oldest month presented first. A customer history view contains summarized and calculated customer information for the predetermined same number of previous months. The data is likewise presented in ascending order with the oldest month presented first.

In an embodiment of the present invention, a customer treatment record layout contains all the customer level data elements that reflect the results of an assessment by assessment engine 26. A customer relationship history record layout contains the customer and product level attributes for use in future assessment. Each month, a single record is written for each customer. An account performance history record layout contains the product level attributes for each account owned by an acquisition system assessment engine value tag-decisioned customer. A decisioned application record layout contains the product level attributes for each application decisioned on the acquisition system assessment engine 26. An account value tag history record layout contains the calculated product level attributes for each application owned by the customer. The customer relationship database 28 is created using a structure query language statement. Tables 34 are also created using a structured query language statement. For each of tables 34, an index is created using a structured query language statement. The index for each table is based on the primary key for that particular table.

In an embodiment of the present invention, to support customer relationship value tags processing, additional files are required to store and transmit data between the various programs. The customer extract file 56 transmits data from the customer information database 24 to the matching driver 58 and the assessment driver 32. The acquisition decisions file 68 allows the acquisition system 22 to update the customer relationship value database 28 when a customer relationship value treatment is used. A customer assessment parameters table file stores parameter information that controls processing of customer information database 24 customers. A check point file stores the ID of the last customer that was processed. The check point process supports restart of the assessment driver 32 and the customer relationship assessment engine 26. A relationship value tag extract to the assessment engine 26 file is created by the assessment driver 32. It contains the customer extract with calculated relationship value tag attributes. The information is used by the assessment engine 26 to calculate future value and to segment the customers. A customer information database relationship value tag update file is created to transmit the future values and present values from the assessment engine 26 to the customer information database 24.

In an embodiment of the present invention, the customer relationship value tags assessment process is designed to utilize various data files to store customer and account level data. These data files are used by various programs. The customer extract file 56 is a sequential file used to pass customer and account level information from the customer information database 24 to the assessment engine 26. The data in this file is used to calculate the customer value tags and is held in two distinct record types. These distinct record types are customer extract records and customer account records. Each customer has one customer extract record and one or more customer account records. A customer account record is received for every account owned by the customer. The customer extract record contains all customer-level and household-level data used to calculate relationship value tags and to generate treatment actions. The customer information database 24 database management system is the data source for this information. The data is extracted using structured query language queries and formatted onto the customer extract file 56 according to a predefined record layout. The data is refreshed monthly. Hence, existing customer extract records are replaced, and records for new customers are added. The update of this record takes place after the customer information database 24 normal monthly load. All customer records are stored on this file.

In an embodiment of the present invention, the customer account record contains the data for each account owned by a customer. The customer information database 24 database management system is the data source for this information. The data is extracted using structured query language queries and formatted onto the financial institution retail customer extract file 56 according to a customer account record layout. The data is refreshed once each month. Applications belonging to existing customers are replaced and new applications are added. In addition, applications for new customers are added. The update of this record takes place after the customer information database 24 normal monthly load. The acquisition decisions file 68 is updated by the acquisition system 22 daily to notify the assessment engine 26 when a relationship value tag treatment is used. A record is written to file 68 for every acquisition decision involving a relationship value tag. Therefore, each customer may have multiple records on file 68, i.e., one record for each product. The records are deleted from file 68 when the customer information database 24 sends a corresponding account record (for booked applications), or the matching driver 58 updates the customer treatment table after the acquisition system 22 issues a turndown on an application.

In an embodiment of the present invention, an acquisition decisions record contains account and customer identification information. It also contains an indicator of whether the account was approved or turned down. The acquisition system 22 database is the data source for this information. The data is formatted according to an acquisition decisions record layout. New records are written to the file daily by the acquisition system 22. The records are deleted by the matching driver 58 when the related account record is received on the customer extract file 56. The predefined customer assessment parameters table is accessed by the assessment driver 32 to determine the number of customers to process on a given weekday and to load the parameters to calculate the present value. A customer assessment parameter record contains parameter information used in the customer assessment process. The assessment engine 26 is the data source for this information. The data is updated each time the assessment engine 26 parameter update process is executed. The data is updated on a workstation parameter graphical user interface, committed, converted, and uploaded to the mainframe. The assessment engine 26 loads the new tables into the file on a daily basis. A check point file is created for the assessment driver 32 and assessment engine 26 processing. The file is used by each of these programs to indicate which customer was last processed. Two records are created for use in restart processing, for example, if an error occurs or a particular program is manually terminated. As each program runs, it continually reads and rewrites the respective record after processing a customer.

In an embodiment of the present invention, a data file check point file is created. The assessment driver 32 and assessment engine 26 are the data sources for this information. The data is rewritten to this file after each customer is processed. The data is formatted according to a check point record layout. The data is refreshed every time the assessment driver 32 or the assessment engine 26 is run. A relationship value tag extract to assessment engine/QSAM assessment parameters table file is created by the assessment driver 32 and used for assessment engine 26 processing. This file contains the customer number, inbound events, customer values, and customer information. A QSAM assessment parameters table account extract file is created by the assessment driver 32. The assessment driver 32 and customer information database 24 are the data sources for this information. The data is written to this file after accessing various attributes for each customer. The data is formatted according to a check point record layout. The data is refreshed every time the assessment driver 32 or the assessment engine 26 is invoked. A customer information database 24 relationship value tag update sequential file is created to transmit data from the assessment engine 26 to the customer information database 24. The tags update driver 62 writes a record for each customer. A new file is created each time the assessment engine 26 is executed. One record is written for each customer. A customer extract record layout contains all the customer level data elements necessary to generate the value scores. A single record is written for each customer. A customer account record layout contains all the customer account level data elements necessary to generate the value scores. A single record is written for each customer. An acquisition decision record layout contains all the product level data for any application opened by the customer using assigned treatments. A single record is written for each application. Customer assessment parameter tables contain all the customer assessment parameter fields. A single record is written for each source system. Other customer assessment parameter tables contain all the customer assessment parameter fields. A single record is likewise written for each source system. A check point file contains the customer identification of the last customer that was processed.

In an embodiment of the present invention, the acquisition decisions file 68 contains the data elements necessary to match records on the file with customer account records on the customer extract file 56. Customer assessment parameter tables contain the customer assessment parameter data elements for each source system ID. A check point file contains the customer ID of the last account processed by the assessment driver 32 and the customer assessment facility 26. The customer extract sequential file 56 contains the data elements for all customer level and product level information. The dataset is defined as sequential. A customer information database 24 update sequential file contains the data elements to update the customer information database 24 with relationship value tags information. The dataset is likewise defined as sequential.

Figure 12:
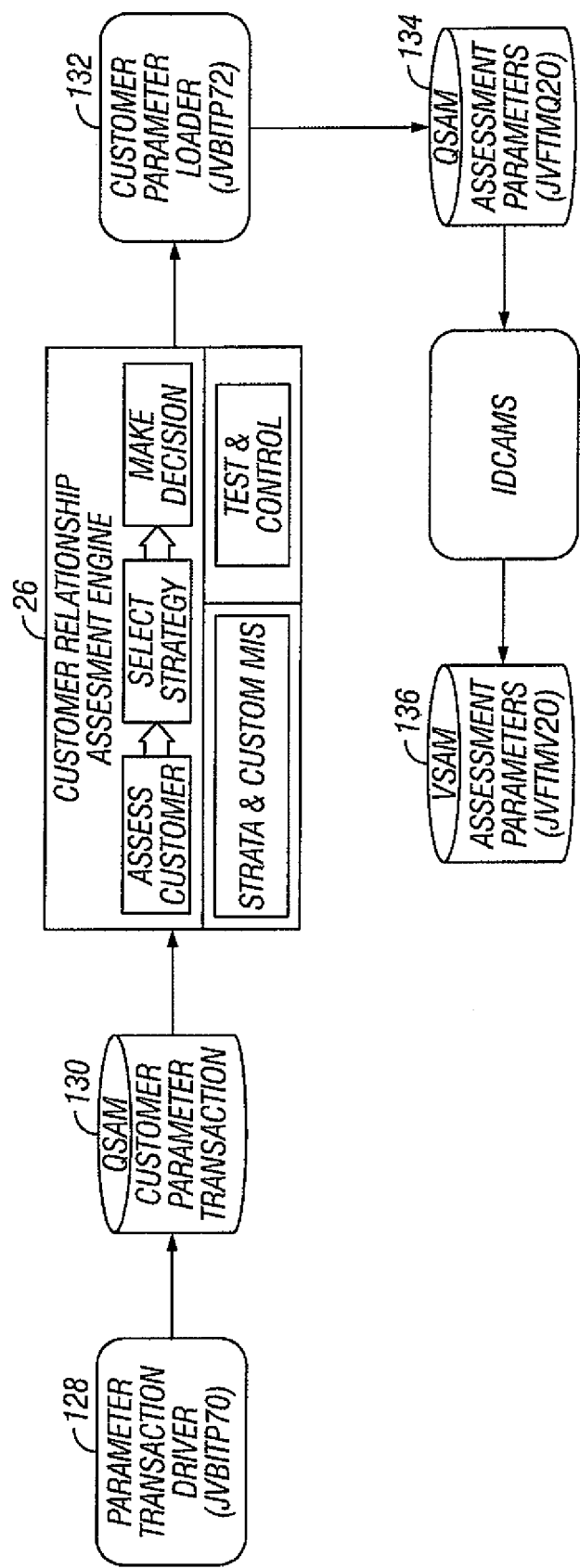
FIG. 12 is a schematic diagram which provides further detail regarding the process of updating the customer assessment parameter tables for an embodiment of the present invention.

In an embodiment of the present invention, the customer assessment parameter tables are used by the assessment driver 32 to determine how many accounts to process on a given day of the week and to calculate the present value. The assessment engine 26 generates the instructions for the customer assessment parameter tables file. The instructions are generated before the evaluation of the customers. FIG. 12 is a schematic diagram which provides further detail regarding the process of updating the customer assessment parameter tables for an embodiment of the present invention. The parameter transaction driver 128 formats and writes a transaction to customer parameter transaction QSAM file 130. The assessment engine 26 reads QSAM file 130 and prepares the fields that are needed by the assessment driver 32 to process the accounts. The customer parameter loader 132 formats the fields into multiple instructions and writes them to the assessment parameters file 134. File 134 is then converted from QSAM format 134 to VSAM format 136. The assessment parameters file 136 is accessed by the assessment driver 32 to determine the number of accounts to process and the constants needed for present value calculation.

In an embodiment of the present invention, the customer assessment parameter table values are generated by the assessment engine 26. There are three types of table values, namely, processing parameters, which indicate the number of accounts to process; customer level parameters, which indicate the customer-level constants needed to calculate the present value; and product level parameters, which indicate the product-level values needed to calculate the present value. The assessment engine 26 instruction layouts include, for example, a layout for the processing parameters; a layout for the customer-level parameters; and layouts for product parameters for each product. Parameter transaction driver 128 is used to create a transaction. Customer parameter loader 130 is used to read the batch engine 26 output file, strip off certain header information and write the records to the sequential customer assessment parameter file 134. The customer assessment parameter table files contain the customer assessment parameter data elements, with the dataset is defined as VSAM and QSAM, respectively.

In an embodiment of the present invention, customer relationship value tags and their associated treatment actions are generated in the decision engine 24. The data required to assess each customer, however, resides on the customer information data repository 24. Referring to FIG. 2, an extraction process is used to extract both customer level and product level data from the customer information database 24. Periodically, the customer information database 24 generates extracts of all active customers. The extract files are separated by ranges of customer and household numbers. The customer information database 24 is a centralized facility with information on households, customers, and accounts. Database 24 contains both current and historical data at the customer and product levels. Customers are identified by a unique key called the customer number. Periodically, extraction routine 30 is used by the customer information database 24 to create extract files with data on all customers. Extraction routine 30 has a series of structured query language rules that ensure that the correct customers and product data are selected. The rules are executed against the entire customer base. The customer data is then transformed into the relationship value tag predefined record layouts. The extraction routine 30 then writes the data to the customer extract sequential file 56.

In an embodiment of the present invention, predefined rules govern the extraction process. For example, all customers are extracted, including those with bankcard only relationships (i.e., customers without any other retail bank or investment products). Inactive customers are excluded. Summarized customer household level data such as total assets balance is extracted. Detailed product data for all applications owned by the customer is extracted. The customer extract file 56 is a sequential file used to store records on all customers. The customer extract record contains the data that is extracted at the customer and/or household levels, while the customer account record contains the data for each product the customer owns. All data is for the current reporting month as seen by the customer. The retail financial institution customer extract is stored on a sequential file 56 that is refreshed each month. The sequential file 56, with two record types, is implemented to reflect many accounts for a single customer.

In an embodiment of the present invention, the customer information database extraction routine 30 selectively retrieves, transforms, and moves customer data from the customer information database 24 relational tables to the customer extract and customer account records. The routine 30 generates record images to ensure that all fields such as dates and numbers are expressed in standard format. The attributes for the customer extract 56 are populated, while attributes for all the customer's applications are formatted. Routine 30 also assigns record keys for the records. The routine 30 function sorts the customer extract records and customer account records in ascending order by customer number and record type and bulk loads all records into the customer extract sequential file 56. A relationship value tags structured query language query retrieves data from the customer information database 24 tables. The query selects financial institution retail customers that have been active for a predetermined number of months. A customer extract record layout contains all the customer level data elements necessary to generate the value scores. A single record is written for each customer. A customer application record layout contains all the product level data for any application owned by the customer. A single record is written for each application. The customer extract sequential file 56 contains the data elements for all customer level and product level information.

Figure 13:
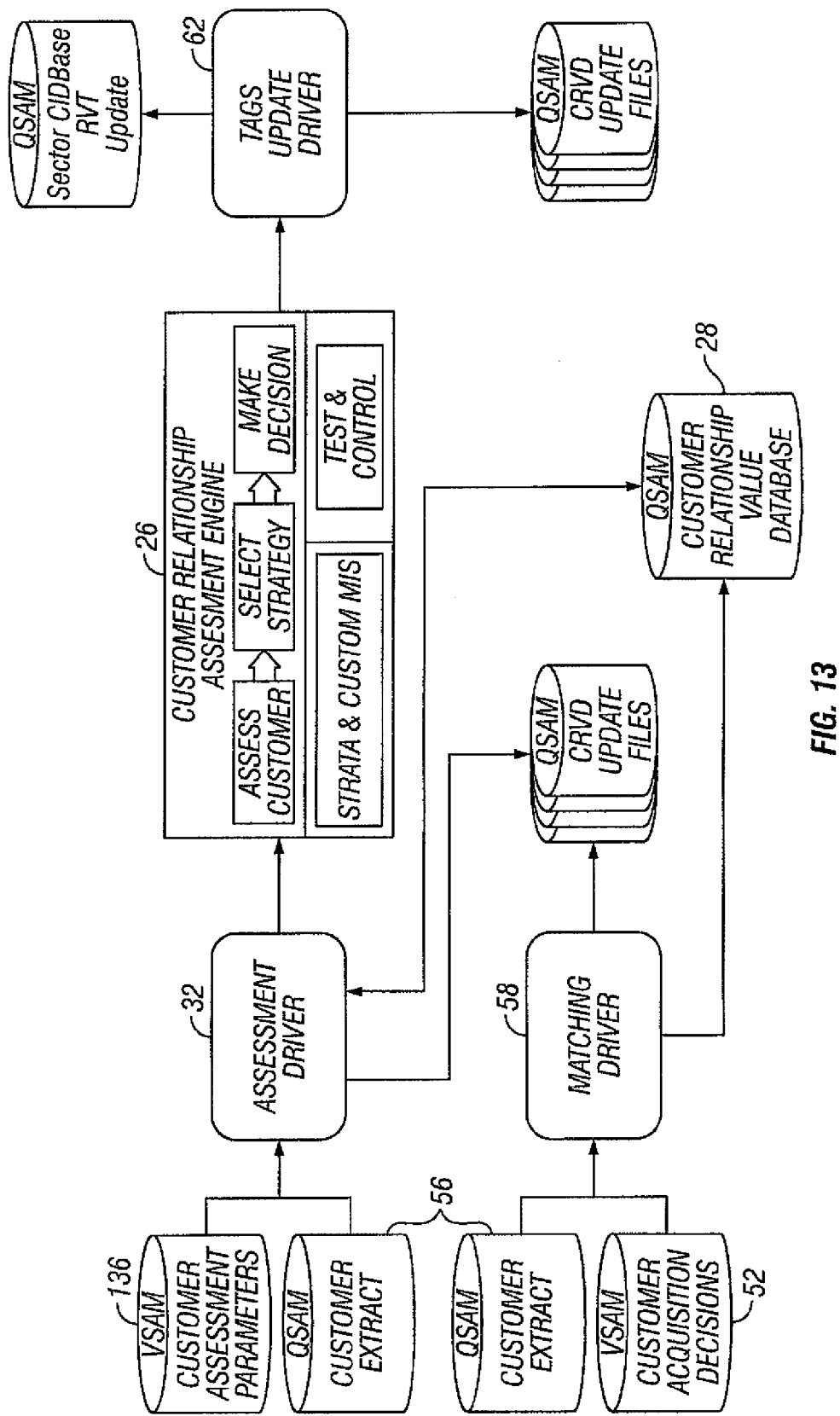
FIG. 13 is a schematic diagram which provides further detail regarding the customer assessment process for an embodiment of the present invention.

In an embodiment of the present invention, the customer assessment process includes batch processing of the customer information database 24 customer extract file 56 to produce a formatted assessment engine 26 transaction file. FIG. 13 is a schematic diagram which provides farther detail regarding the customer assessment process for an embodiment of the present invention. The assessment engine 26 transaction file contains customer-based data and inbound activity codes that are used to assign value tags and treatment instructions to each customer. The assessment driver 32 serves as the assessment engine 24 front-end processor to prepare all customer records for relationship value tags calculation. This processor initiates the evaluation of the customers that reside on the customer information database 24 customer extract sequential file 56 in batch. The processor reads the sequential file 56 for each customer. Using the next assessment date from the customer treatment table, it determines if the customer should be evaluated by the assessment engine 26. The batch assessment of each customer is as follows. Product level data is recorded to the customer relationship value database 28 decisioned application table 52 and application report group table 54 for performance reporting. Customer-based information is prepared by the assessment driver 32 for processing by the batch assessment engine 26. The assessment engine 26 calculates present and future value scores and generates treatment instructions. The tags update driver 62 distributes the assessment engine 26 assessment results to the appropriate target systems.

Figure 14:
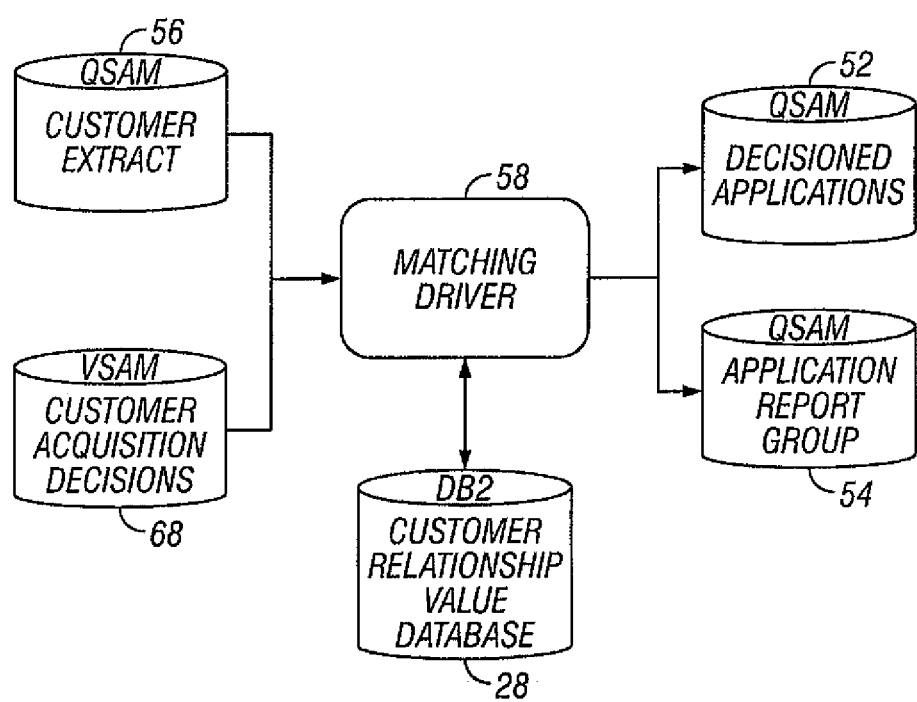
FIG. 14 is a schematic diagram which provides further detail regarding the matching driver process for an embodiment of the present invention.
Figure 15:
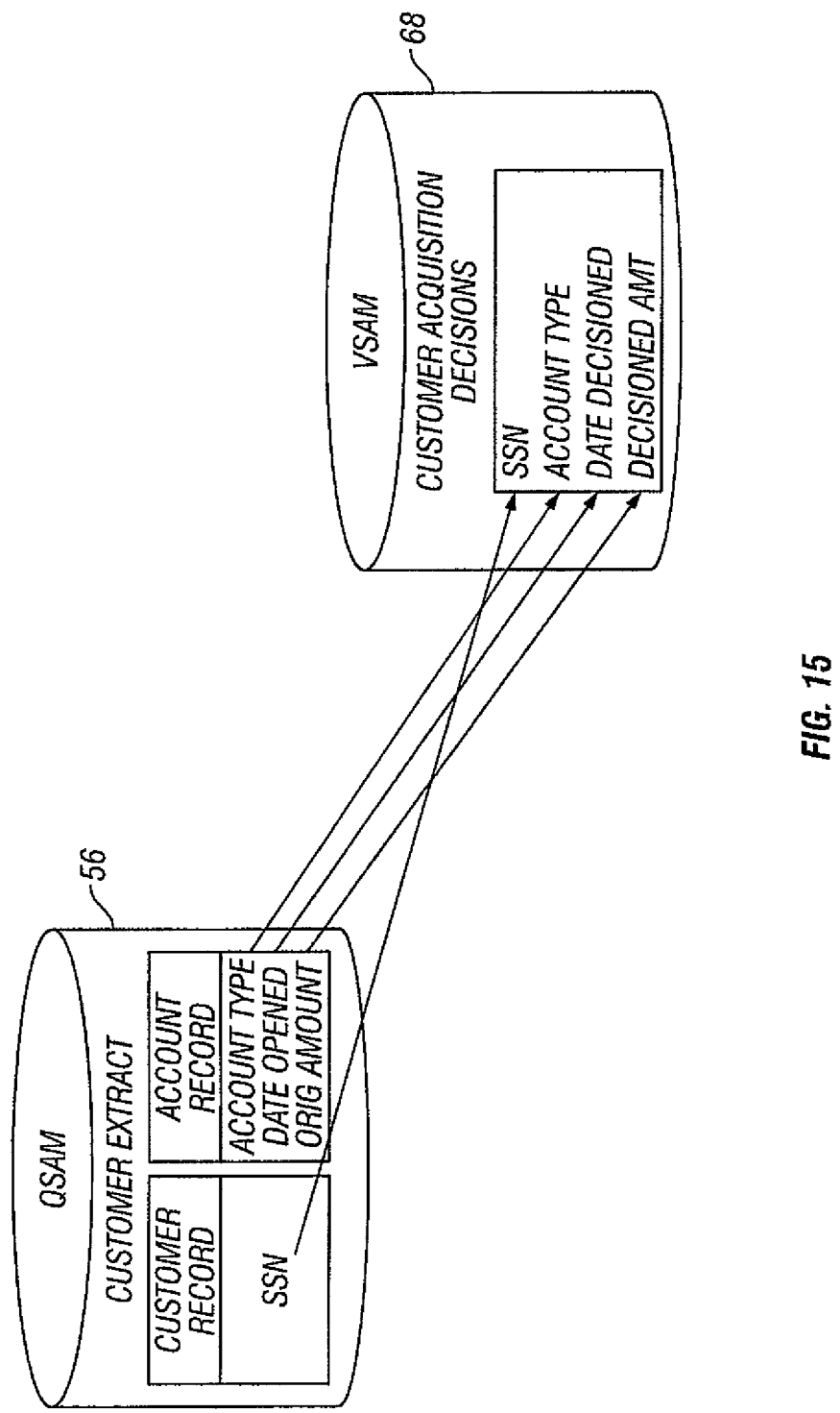
FIG. 15 is a schematic diagram which provides further detail regarding the decision record matching process for an embodiment of the present invention.

In an embodiment of the present invention, the acquisition system-decisioned application matching driver 58 performs decision record matching to update the decisioned application table 52, the application report group table 54, and assessed customer table 36 on the customer relationship value database 28. FIG. 14 is a schematic diagram which provides further detail regarding the matching driver 58 process for an embodiment of the present invention. During the execution of the decision matching process, the matching driver 58 reads the customer acquisition decision file 68 and compares the records on that file with accounts from the customer extract sequential file 56. The matching driver 58 first reads the customer acquisition decision file 68 sequentially. Based upon the status of the application decision on the acquisition decision record 68, the customer ID is used to retrieve all accounts from the customer extract sequential file 56. In the case of an approved decision, the assessed customer table 36 is updated with the decisioned date, and a record is written to the decisioned application table 52. The record is then deleted from the customer acquisition decision file 68. In the case of a turndown decision, the assessed customer table 36 is updated with the decisioned date, and the record is deleted from the customer acquisition decision file 68, in which case, a record is not written to decisioned application table 52. FIG. 15 is a schematic diagram which provides further detail regarding the decision record matching process for an embodiment of the present invention. If an account number is found on the acquisition decisioned record 68, the matching process 58 performs an account number comparison against the customer extract file 56.

Figure 16:
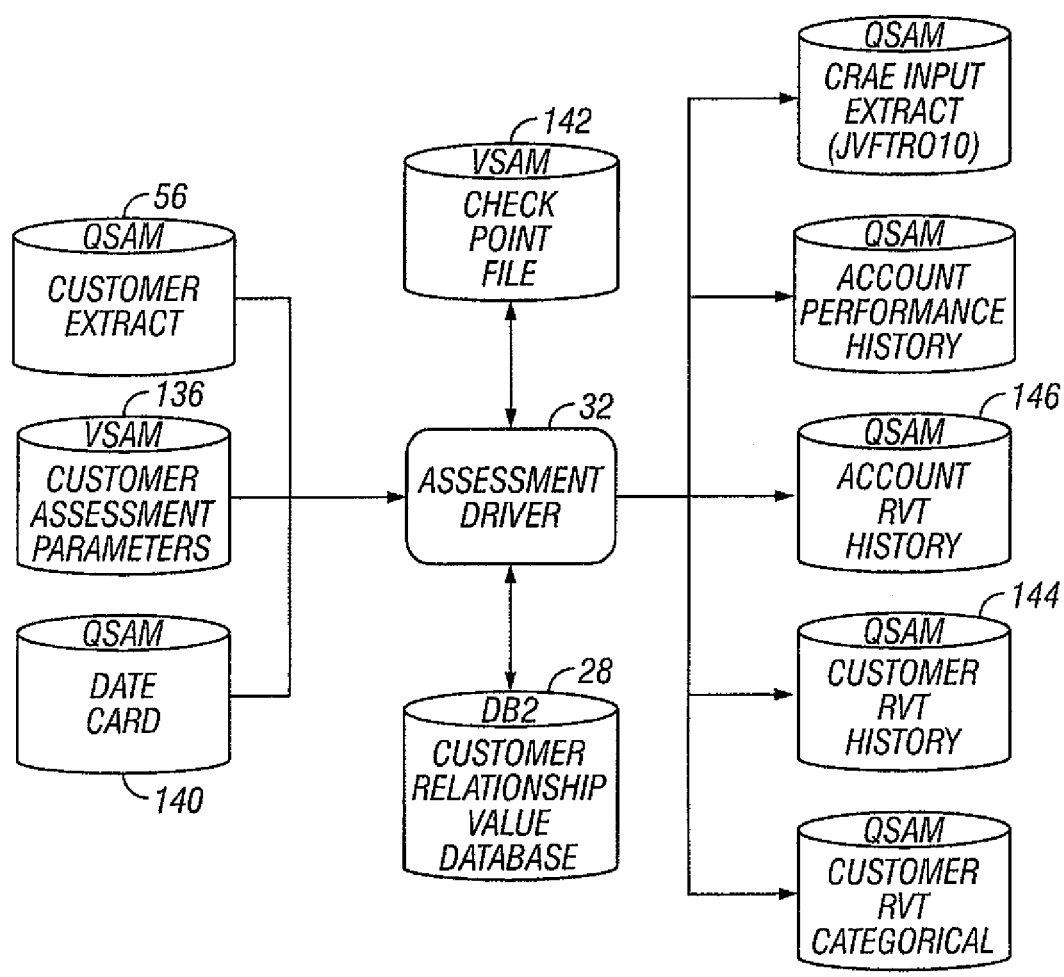
FIG. 16 is a schematic diagram which provides further detail regarding the assessment driver process for an embodiment of the present invention.

In an embodiment of the present invention, the assessment driver 32 is an assessment engine 26 front-end processor that prepares the customer extract and transaction records that are used by the assessment engine 26. FIG. 16 is a schematic diagram which provides further detail regarding the assessment driver 32 process for an embodiment of the present invention. The assessment driver 32 accesses all of the customer records on the customer extract sequential file 56. The assessment driver 32 first accesses the customer assessment table 136 to determine the number of customers to process on that particular day. The assessment driver 32 then invokes an assessment engine date calculator 140 with a request code to determine the day of the week. In addition, the date calculator 140 is invoked to determine the next assessment date for those customers being evaluated in the batch run. The assessment driver 32 then begins to process the customers on the customer extract sequential file 56. All customers with an ID number greater than the customer ID stored on check point file 142 are processed. Also, the assessment driver 32 retrieves the customer treatment record to ensure that the customer's next assessment date is not greater than the current processing date. For each customer processed, the customer relationship value tag history records 144 and the account relationship value tag history records 146 are retrieved from the customer relationship value database 28. The data on the customer relationship value tag history record 146 is formatted and placed on the customer extract 56. To facilitate recovery in the case of an abnormal end of processing by the assessment driver 32, the check point file 142 is updated with the customer ID of the last customer processed When the assessment driver 32 is executed for the first time on a given processing day, check point file 142 contains the customer ID of the last customer processed on the previous day. As the assessment driver program 32 processes each customer, it generates transactions and an extract record for each customer. These are written to a sequential file. This file is then processed by the assessment engine 26. For every customer that is processed each day, the assessment driver 32 writes an activity to a relationship value tag extract.

Figure 17:
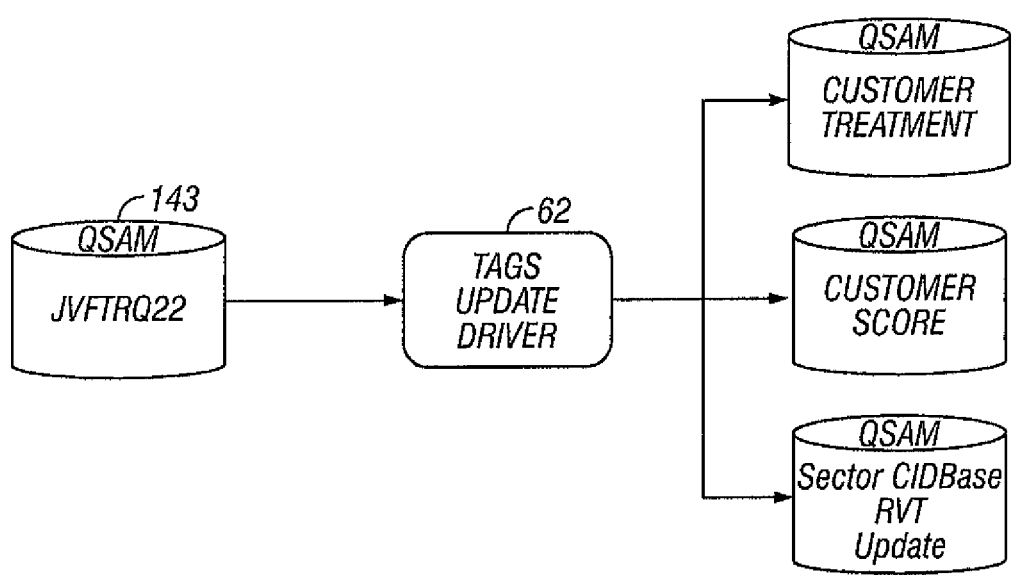
FIG. 17 is a schematic diagram which provides further detail regarding processing by the tags update driver for an embodiment of the present invention.

In an embodiment of the present invention, in order for the assessment engine 26 to efficiently perform relationship value tag evaluation in batch, the decision engine 26 bypasses collections specific logic. The assessment engine 26 performs relationship value tag-specific logic, such as updating the customer relationship value database 28. For relationship value tag processing on the assessment engine 26, all pertinent data is written to the customer treatment instructions, which are then loaded in the customer relationship value database 28. FIG. 17 is a schematic diagram which provides further detail regarding processing by the tags update driver 62 for an embodiment of the present invention. The tags update driver 62 reads the assessment engine 26 output transaction file 143, strips off irrelevant header information, and writes the output to the appropriate sequential file. The sequential files are then loaded into the customer relationship value database 28 with the load utility 60. In addition, a sequential file is created for the customer information database 24. The value tags are then loaded into the customer information database tables.

In an embodiment of the present invention, the customer relationship assessment engine 26 is based upon a baseline batch assessment engine 26 to perform relationship value tag-specific logic and to bypass collections specific processing. The matching driver program 58 reads the acquisition decisions file 68 sequentially to match the acquisition decision records with records on the customer extract file 56. The customer ID is used to retrieve the customer extract record. If a match is found, the record on the acquisition decision file 68 is deleted, an entry is added to the decisioned account table 52 on the customer relationship value database 28 for the matched account, and a customer relationship value tag-approved decision indicator is set to "yes" on the customer treatment table. At the same time, a customer last approved relationship value tag date is set to an account decisioned date on an acquisition decisioned record. The assessment driver program 32 processes the customer extract file 56 and matches the records stored on the file with records on the customer relationship value database 28. The assessment driver 32 then formats an extract record on the file that is passed to the customer assessment facility 26 with instructions. If the relationship value tag-approved indicator is set to "yes," and if the customer last relationship value tag approved date is within the performance evaluation period, the decisioned application table 52 is accessed to retrieve the specific account for which a decision was made. When a match is made on the decisioned application table 52, the segment ID and test group ID are prefilled on the appropriate account history record. Also, the relationship decisioned indicator on the account history table 48 is set to "yes." Accounts that are not matched on the decisioned application table 52 are also written to the account history table 46. On each account, the customer segment ID and test group ID are prefilled from the customer treatment table 38. The tags update driver 62 processes the customer assessment output transaction file and writes the transactions from that file to the relationship value tags history update file.

Figure 18:
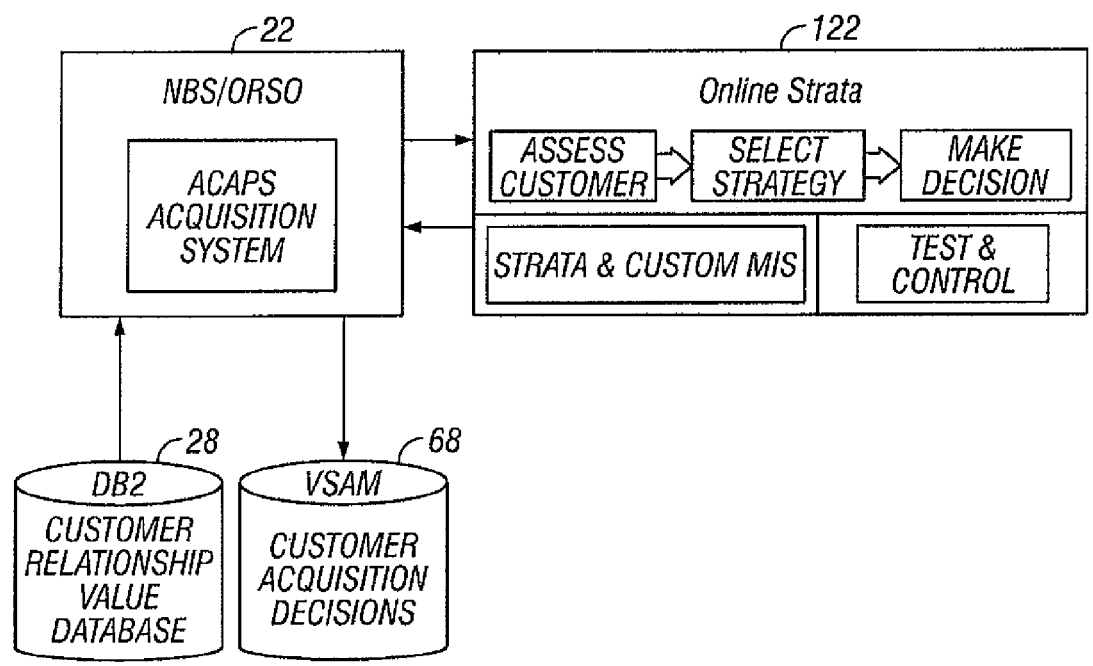
FIG. 18 shows a schematic outline which provides further detail regarding the process flow of value tags based decision execution in customer acquisition for an embodiment of the present invention.

In an embodiment of the present invention, after the value tags are generated in the assessment engine 26, they are utilized by the acquisition system 22 in on-line acquisition decisioning. FIG. 18 is a schematic outline which provides further detail regarding the process flow of value tags based decision execution in customer acquisition for an embodiment of the present invention. Whenever a value-based treatment is used, an appropriate report ID is assigned to the acquisition system 22 application. A report group ID is assigned for each value-based treatment such as line, price, or score. When the application is booked, the acquisition system 22 writes a record to the customer acquisition decision file 68. The acquisition decision record is keyed by the acquisition system application number. Only value-based products are written to the customer acquisition decision file 68. The acquisition system 22 identifies these applications by the presence of an indicator on the relationship value record.

In an embodiment of the present invention, the customer relationship value database 28 is accessed each time a new application is added to the acquisition system 22 or an activity code is manually entered. An indicator on a product maintenance table dictates if the product is using value-based information for customer assessment. The acquisition system 22, using social security number and/or the customer's name, performs a structured query language query against the customer treatment table 38 in the customer relationship value database 28. This query is performed for each customer on the loan application. If a record is found on the customer relationship value database 28, the treatment data is loaded into the appropriate fields on the acquisition system 22 relationship value tags record. During on-line processing of the loan application, the acquisition system 22 loads the treatment actions on the acquisition system 22 extract record. These elements are then mapped to the appropriate attribute tables for use in loan evaluation. Value tags are used to directly override loan criteria such as risk score and line assignment. On the other hand, some approved applications are simply tracked as a control case without any value-based overrides. Applications that are relationship value tag-decisioned are assigned "yes" in a relationship value tab decision attribute. Otherwise the field is set to "no." The relationship value tag decision indicator is written to the acquisition system 22 relationship value tags record. The relationship value tag decision indicator serves as an indicator to write applications to the customer acquisition decision database 68. Whenever an application is automatically or manually booked by the entry of a set-up activity code, a record is written to the customer acquisition decision database 68.

In an embodiment of the present invention, relationship value tag-based approved and turndown applications are written to the customer acquisition decision database 68. When a relationship value tag-based application is turned down, a customer relationship account decision status indicator is set to "turndown." When a relationship value tag-based application is booked, the customer relationship account decision status indicator is set to "approve." The acquisition system 22 interface processor formats the fields on the acquisition system 22 extract record. Logic moves the relationship value tags decision indicator from a final decision instruction to the acquisition system 22 relationship value record on a miscellaneous file. Logic invokes the customer relationship value database 28 access program whenever a customer relationship value database 28 access indicator is "yes." This program is invoked whenever the application is in "add" mode or a user enters an activity code. Logic moves the relationship value tags report group to the acquisition system 22 relationship value record when a "score" or a "line" instruction is returned. An acquisition system 22 state processor invokes the customer relationship value database 28 access program whenever the customer relationship value database 28 access indicator is "yes." This program is invoked whenever the application is in the "add" mode or the user enters an activity code. The state processor logic handles the customer acquisition decision record. It is added or updated whenever a set-up activity code has been entered or generated and an indicator is in the "yes" mode.

In an embodiment of the present invention, depending on the product, a servicing system account number may be available on the acquisition system 22 at the time of approval. The loan account is stored in an application approved loan number field on a master record. When the loan number is not available on-line, it is obtained through the relationship value tags matching driver 58. The loan number to applied to the customer acquisition decision record by a product/servicing system. The acquisition system 22 on-line database access logic initializes the relationship value tag-related fields on the customer relationship value record when prefilling an application. Logic retrieves the customer relationship value record from the miscellaneous file. The acquisition system 22 on-line database update logic updates the miscellaneous file with information on the relationship value record. Product maintenance logic captures and validates the customer treatment indicator. Customer relationship value database 28 access logic retrieves the treatment data for each customer that is on the application using structured query language queries. A customer acquisition decision file 68 module logic performs all activities for the customer acquisition decision file 68. A customer relationship value screen program displays the customer relationship value tag data used in the acquisition system 22 for an application. The customer relationship value tag data is maintained on a record on the miscellaneous file, if applicable.

In an embodiment of the present invention, relationship value tags batch stream jobs are submitted in a predefined order. The first step in the processing cycle is the initialization job which creates the current daily date card file(s). The parameter table upload procedure uploads the relationship value tag parameter tables from a server to a mainframe file periodically, for example, daily. The parameter load procedure copies the sequential parameter table to the parameter table daily. A matching driver 58 pre-processing procedure calls the matching driver 58 which updates the customer relationship value database 28 based upon records from the acquisitions decision file 68. An assessing driver pre-processing procedure executes the assessment driver 32 to format a transaction extract file for the customer assessment batch decision engine 26. A customer assessment facility processing procedure runs the customer relationship assessment engine 26.

In an embodiment of the present invention, the customer relationship assessment engine 22 uses control tables to process customer level inbound transaction extract files created by the assessment driver 32. The assessment engine 22 evaluates customers with inbound activities based on management-defined risk parameters contained in the control tables. A tags update driver/back end processing procedure calls the tags update driver program 62, which splits the assessment engine 26 output instruction file into the customer treatment update file and customer score update file. It also strips unnecessary headers from each record and reformats each record into its table-defined format for the appropriate external file. A history update processing procedure invokes load utility 60 to load the update files into the customer relationship value database 28. A consolidated reporting spool splitter processing procedure calls a consolidated reporting spool splitter program, merges an on-request consolidated reporting file with a batch consolidated reporting file, splits a combined audit file into specific detail files and prints a consolidated reporting spool splitter error report. A report processing procedure calls the programs which produce process reports (inventory, error and tree audit).

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

The invention claimed is:

1. A method for implementation by one or more data processors forming part of at least one computing system, the method comprising:

determining, by at least one data processor, present and future values for a plurality of customers of a financial institution, the present values characterizing a current value of a customer to the financial institution and being determined by a computer-implemented current value algorithm, the future values characterizing a forecasted value of a customer to the financial institution and being determined by a computer-implemented future value algorithm using a predictive statistical model;

segmenting, by at least one data processor, the plurality of customers into a set of groups based on the determined values;

first modeling, by at least one data processor, each of a first subset of the set of groups using acquisition decision processes of the financial institution;

second modeling, by at least one data processor, each of a second subset of the set of groups using value-based decision processes of the financial institution; and characterizing, by at least one data processor, performance of the acquisition decision processes and the value-based decision processes based on the first and second modeling by storing value tags for each of the customers in a remote customer relationship value database coupled to a customer acquisition system via the Internet, wherein the determining of the present value includes adding, for each segment of the plurality of customers, a first weighted sum of continuous variables and a second weighted sum of categorical variables to obtain the future value associated with the segment, the future value associated with the segment being the future value of each individual in the segment;

wherein the first weighted sum comprises a product of the continuous variables and corresponding coefficients; and the second weighted sum comprises a product of the categorical variables and its respective coefficients;

initiating, by at least one data processor, customer treatment actions based on the characterized performance.

2. A method as in claim 1, wherein the present value is a weighted average value for the customer over a predefined time period.

3. A method as in claim 1, wherein the present value for a customer is a sum all of present values of the customer's products less total transaction products for such products.

4. A method as in claim 1 further comprising:

modifying, by at least one data processor, data records associated with each customer to include value tags characterizing the corresponding present and future values.

5. A method as in claim 1 further comprising:

generating, by at least one data processor, a report characterizing the performance of the of the acquisition decision processes and the value-based decision processes.

6. A method as in claim 1, wherein the financial institution is a bank.

7. A method comprising: for implementation by one or more data processors forming part of at least one computing system, the method comprising:
- obtaining, by at least one data processor, previous values of accounts associated with individuals;
- determining, by at least one data processor, present values of the individuals, present value for each individual comprising a sum of present values of accounts associated with the individual, present value of each account of the individual being a weighted average of a corresponding most recent set of the previous values;
- segmenting, by at least one data processor and based on the present values of the individuals, the individuals into a plurality of groups;
- segmenting, by atl least one data processor, each group into a plurality of segments, an individual being included in a single segment;
- calculating, by at least one data processor for each segment, a first weighted sum of continuous variables associated with the segment and a second weighted sum of categorical variables associated with the segment;
- adding, by at least one data processor for each segment, the first weighted sum and the second weighted sum to obtain a future value associated with the segment, the future value associated with the segment being the future value of each individual in the segment;
- wherein the first weighted sum comprises a product of the continuous variables and corresponding coefficients; and the second weighted sum comprises a product of the categorical variables and respective coefficients;
- initiating, by at least one data processor, customer treatment actions based on the characterized performance.

8. The method of claim 7, wherein the present value and the future value of each individual are used by an institution to determine a treatment of the individual.

9. The method of claim 7, wherein the future value of each individual characterizes product holdings for the individual during a future period of time.

10. The method of claim 7, wherein the segmenting of each group into the plurality of segments is based on a number of products associated with each individual, duration of the association between each product and corresponding individual, duration of association between each individual and corresponding institution that offers the product, and payment due for each individual.

11. The method of claim 7, wherein the continuous variables include one or more of: average asset numbers, average asset balances, maximum asset balances, maximum asset correlation balances, average asset correlation interests, average liability numbers, average liability balances, maximum liability balances, average liability correlation balances, average liability fees, and total footings.

12. A non-transitory computer program product storing instructions, which when executed by at least one programmable processor, cause the at least one programmable processor to perform operations comprising:
- obtain a plurality of previous values of accounts associated with a plurality of individuals;
- determine present values of the individuals, present value for one or more individuals of the plurality of individuals comprising a sum of present values of a plurality of accounts associated with the one or more individuals, present values of one or more accounts of the one or more individuals being weighted averages of corresponding most recent sets of the plurality of previous values;
- segment, based on the present values of the individuals, the individuals into a plurality of segments, each individual being included in a single segment;
- calculate, for each of one or more segments, a first weighted sum of continuous variables associated with the segment and a second weighted sum of categorical variables associated with the segment;
- add, for each of the one or more segments, the first weighted sum and the second weighted sum to obtain a future value associated with the segment, the future value associated with the segment being the future value of at least one individual in the segment;

wherein the first weighted sum comprises a product of the continuous variables and corresponding coefficients; and the second weighted sum comprises a product of the categorical variables and respective coefficients;
- initiate customer treatment actions based on the characterized performance.

13. The computer program product of claim 12, wherein the continuous variables include maximum household credit limits, average household median incomes, average household service counts, average household service balances, average payment bills, average delinquency delays, and household oldest member dates.

* * * * *

UNITED STATES PATENT AND TRADEMARK OFFICE
CERTIFICATE OF CORRECTION

PATENT NO.        : 8,600,854 B2                                        Page 1 of 1
APPLICATION NO.   : 12/111802
DATED             : December 3, 2013
INVENTOR(S)       : Mona Mayr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1113 days.

Signed and Sealed this
Seventh Day of July, 2015

Michelle K. Lee
*Director of the United States Patent and Trademark Office*